United States Patent [19]

Tanaka et al.

[11] Patent Number: 5,745,381
[45] Date of Patent: Apr. 28, 1998

[54] APPARATUS AND METHOD FOR EVALUATING OPERABILITY OF APPLIANCES AND AN APPARATUS FOR IMPROVING THE OPERABILITY OF THE APPLIANCES

[75] Inventors: Hirohiko Tanaka, Moriguchi; Takeshi Nawata, Kadoma, both of Japan

[73] Assignee: Matsushita Electric Industrial, Osaka-fu, Japan

[21] Appl. No.: 494,964

[22] Filed: Jun. 26, 1995

[30] Foreign Application Priority Data

Jun. 27, 1994 [JP] Japan .................. 6-144770

[51] Int. Cl.⁶ .................................. G06F 17/60
[52] U.S. Cl. .......... 364/551.01; 364/400; 364/550
[58] Field of Search ................... 364/400, 401 R, 364/402, 550, 551.01; 377/16; 434/219

[56] References Cited

U.S. PATENT DOCUMENTS

| | | | |
|---|---|---|---|
| 2,599,766 | 6/1952 | Linsley, Jr. | 377/16 |
| 2,961,777 | 11/1960 | Neville et al. | 434/219 X |
| 2,984,017 | 5/1961 | Pask | 434/219 |
| 3,303,471 | 2/1967 | Duncan et al. | 364/550 |
| 3,321,704 | 5/1967 | Mann | 377/16 |
| 3,483,635 | 12/1969 | Green | 434/219 |
| 3,560,665 | 2/1971 | Pountney et al. | 434/219 X |
| 3,590,227 | 6/1971 | Porter et al. | 364/179 |
| 3,809,869 | 5/1974 | Gebald | 377/16 X |
| 5,134,574 | 7/1992 | Beverstock et al. | 364/551.01 |
| 5,212,635 | 5/1993 | Ferriter | 364/402 |
| 5,394,322 | 2/1995 | Hansen | 364/148 |

Primary Examiner—Edward R. Cosimano
Attorney, Agent, or Firm—Price, Gess & Ubell

[57] ABSTRACT

A method for evaluating operability of a completed appliance at a designing stage includes the steps of forming a function-operation correspondence table which includes functions that the completed appliance is supposed to have, operational parts to exert each of the functions, and a number of times each of the operational parts is actuated to exert each of the functions; finding a total number of times each of the operational parts is actuated to exert all the functions in a case where all the functions are selected one time each, by using the function-operation correspondence table; adding up all the total numbers of times; calculating a ratio of the number of times each of the operational parts is actuated to the total numbers of times all the operational parts are actuated to exert all the functions; finding unbalance of using frequencies among the operational parts, from the calculated ratio and the number of the operational parts; and evaluating the operability of the appliance, based on the unbalance found.

34 Claims, 24 Drawing Sheets

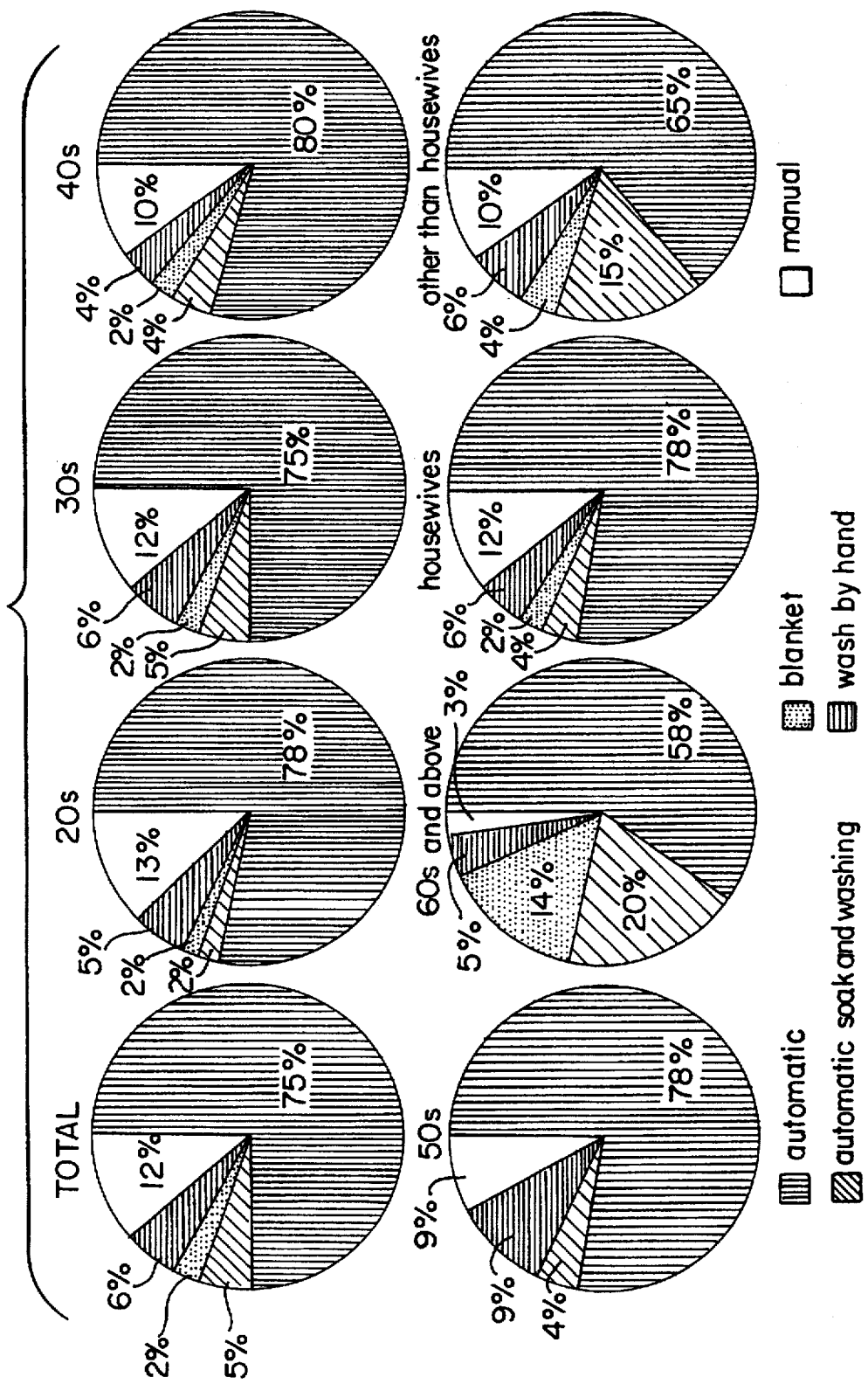

FIG. 3

| | | water level | reserved time | start button | mode button | water level button | spinning level button | reservation button | operating speed (second) number of operations | operating speed (second) initial trial | expected values buttons | expected values number of operations |
|---|---|---|---|---|---|---|---|---|---|---|---|---|
| 1 | soak and washing | - | - | 1 | 4 | 0 | 0 | 0 | 5 | 14.43 | 14.80 | 11.71 |
| 2 | washing by hands + water level setting | middle | - | 1 | 3 | 0 | 0 | 0 | 4 | 10.96 | 12.70 | 10.07 |
| 3 | blanket | high | - | 1 | 2 | 0 | 0 | 0 | 3 | 8.22 | 10.60 | 8.42 |
| ... | | | | | | | | | | | | |
| 7 | automatic + spinning setting | - | - | 1 | 0 | 0 | 1 | 0 | 2 | 6.40 | 7.40 | 6.77 |
| 8 | blanket | high | - | 1 | 2 | 0 | 0 | 0 | 3 | 9.21 | 10.60 | 8.42 |
| 9 | automatic water pouring | - | - | 1 | 1 | 0 | 0 | 0 | 2 | 7.05 | 8.50 | 6.77 |
| ... | | | | | | | | | | | | |
| 13 | automatic + water-level & spinning setting | low | - | 1 | 0 | 4 | 2 | 0 | 7 | 12.67 | 13.22 | 15.00 |
| 14 | blanket | high | - | 1 | 2 | 0 | 0 | 0 | 3 | 9.60 | 10.60 | 8.42 |
| 15 | soak and washing + water-level & spinning setting | high | - | 1 | 4 | 1 | 1 | 0 | 7 | 17.83 | 17.00 | 15.00 |
| ... | | | | | | | | | | | | |
| 19 | washing by hands | middle | - | 1 | 3 | 0 | 0 | 0 | 4 | 10.93 | 12.70 | 10.07 |
| 20 | automatic water pouring + water-level & spinning setting | high | - | 1 | 1 | 1 | 2 | 0 | 5 | 12.13 | 11.70 | 11.71 |
| 1 | soak and washing | - | - | 1 | 4 | 0 | 0 | 0 | 5 | 11.62 | 14.80 | 11.71 |
| 2 | washing by hands + water level setting | middle | - | 1 | 3 | 0 | 0 | 0 | 4 | 10.15 | 12.70 | 10.07 |
| 3 | blanket | high | - | 1 | 2 | 0 | 0 | 0 | 3 | 8.32 | 10.60 | 8.42 |
| ... | | | | | | | | | | | | |
| 7 | automatic + spinning setting | - | - | 1 | 0 | 0 | 1 | 0 | 2 | 7.01 | 7.40 | 6.77 |
| 8 | blanket | high | - | 1 | 2 | 0 | 0 | 0 | 3 | 7.67 | 10.60 | 8.42 |
| 9 | automatic water pouring | - | - | 1 | 1 | 0 | 0 | 0 | 2 | 5.95 | 8.50 | 6.77 |
| ... | | | | | | | | | | | | |
| 13 | automatic + water-level & spinning setting | low | - | 1 | 0 | 4 | 2 | 0 | 7 | 10.74 | 13.22 | 15.00 |
| 14 | blanket | high | - | 1 | 2 | 0 | 0 | 0 | 3 | 6.93 | 10.60 | 8.42 |
| 15 | soak and washing + water-level & spinning setting | high | - | 1 | 4 | 1 | 1 | 0 | 7 | 15.26 | 17.00 | 15.00 |
| ... | | | | | | | | | | | | |
| 19 | washing by hands | middle | - | 1 | 3 | 0 | 0 | 0 | 4 | 9.11 | 12.70 | 10.07 |
| 20 | automatic water pouring + water-level & spinning setting | high | - | 1 | 1 | 1 | 2 | 0 | 5 | 11.77 | 11.70 | 11.71 |

FIG. 6A
wash wash button ON
↓
rinse button ON
↓
rinse button ON

FIG. 6B
water-save wash wash button ON
↓
rinse button ON
↓
spin-dry button ON

FIG. 6C
rinse rinse button ON
↓
spin-dry button ON

FIG. 7

| functions \ operational parts | button 1 | button 2 | button 3 |
|---|---|---|---|
| function A | twice | once | |
| function B | once | once | once |
| function C | once | | once |

FIG. 8

| functions \ operational parts | button 1 | button 2 | button 3 | |
|---|---|---|---|---|
| function A | twice | once | | |
| function B | once | once | once | |
| function C | once | | once | |
| total operations | four times | twice | twice | 8 times total |
| operation ratio | 0.50 | 0.25 | 0.25 | |

FIG. 10

| functions | function use ratios |
|---|---|
| function A | 0.2 |
| function B | 0.2 |
| function C | 0.6 |

FIG. 11

| functions \ operational parts | button 1 | button 2 | button 3 | |
|---|---|---|---|---|
| function A | 0.4 | 0.2 | | |
| function B | 0.2 | 0.2 | 0.2 | |
| function C | 0.6 | | 0.6 | |
| total weighted operations | 1.2 | 0.4 | 0.8 | 2.4 in total |
| total weighted operation ratio | 0.50 | 0.25 | 0.25 | |

FIG. 12

| operational parts | average operation time |
|---|---|
| button 1 | 2 seconds |
| button 2 | 4 seconds |
| button 3 | 6 seconds |

FIG. 13

| functions \ operational parts | button 1 | button 2 | button 3 | total expected operation time | expected operation time ratio |
|---|---|---|---|---|---|
| function A | 4 seconds | 4 seconds |  | 8 seconds | 0.29 |
| function B | 2 seconds | 4 seconds | 6 seconds | 12 seconds | 0.43 |
| function C | 2 seconds |  | 6 seconds | 8 seconds | 0.29 |
|  |  |  |  | 28 seconds in total |  |

FIG. 15

| functions | function usage ratio | expected operation time | expected weighted operation time | expected weighted operation time ratio |
|---|---|---|---|---|
| function A | 0.2 | 8 seconds | 1.6 seconds | 0.18 |
| function B | 0.2 | 12 seconds | 2.4 seconds | 0.27 |
| function C | 0.6 | 8 seconds | 4.8 seconds | 0.55 |
| | | | 8.8 seconds in total | |

FIG. 16

| functions \ operational parts | button 1 | button 2 | button 3 |
|---|---|---|---|
| function A | once | twice | |
| function B | | | three times |
| function C | once | once | |

FIG. 17

| functions\operational parts | button 1 | button 2 | button 3 | expected operation time |
|---|---|---|---|---|
| function A | 2 seconds | 8 seconds | | 10 seconds |
| function B | | | 18 seconds | 18 seconds |
| function C | 2 seconds | 4 seconds | | 6 seconds |
| | | | | 34 seconds in total |

| operational parts | total operation time | operations | average operation time |
|---|---|---|---|
| button 1 | 60 seconds | 20 times | 3 seconds |
| button 2 | 30 seconds | 15 times | 2 seconds |
| button 3 | 10 seconds | 10 times | 1 seconds |

FIG. 24
weak
| red strong | red weak | bilingual | UHF |
|---|---|---|---|
| green strong | green weak | volume down | teletext |
| yellow strong | yellow weak | satellite broadcasting | other display |
| weather (Japan) | general news | sports news | westen Japan news |
|---|---|---|---|
| weather (West) | stocks (Tokyo) | stocks (London) | stocks (New York) |
| weather (East) | Exchange (Tokyo) | Exchange (New York) | other display |

FIG. 26
| automatic wash | | spin-dry | ON |
|---|---|---|---|
| amount increase | loud | heavy laundry | other display |
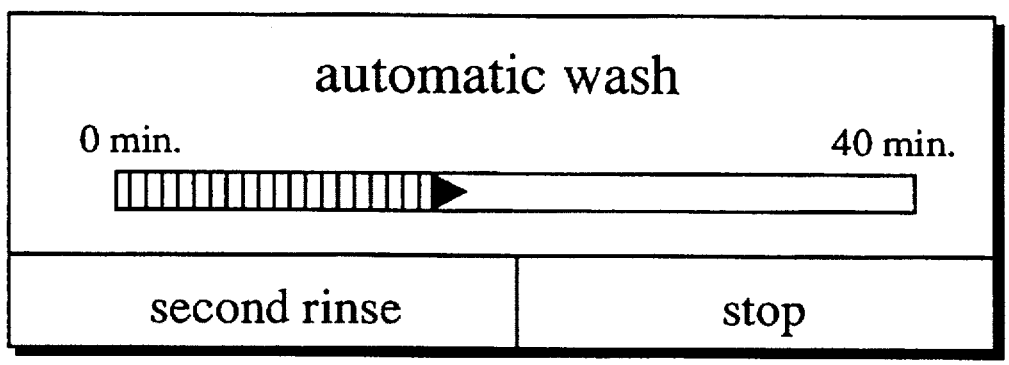

APPARATUS AND METHOD FOR EVALUATING OPERABILITY OF APPLIANCES AND AN APPARATUS FOR IMPROVING THE OPERABILITY OF THE APPLIANCES

BACKGROUND OF THE INVENTION

(1) Field of the Invention

The present invention relates to an apparatus and method for quantitatively evaluating the operability of operational parts included in household electrical appliances at the designing stage, and further to an apparatus for allowing the appliances to operate with improved operability.

(2) Description of the Related Art

If we take the latest washing machines as an example of the household electrical appliances, they are provided with various functions as shown in FIG. 1. They include an "automatic mode" in which wash, rinse, and spin-dry are all performed automatically, a "reserved automatic mode" in which the "automatic mode" starts at a specified time, an "automatic mode with modified water level" in which the automatic mode is performed with more or less water because of a large or small amount of laundry, and a "manual mode" in which users are in constant attendance.

These functions are exerted by user' actuating a number of selection buttons, so that it is important to arrange the selection buttons on a priority basis of easiest-to-use. This also holds true for other household electric appliances.

As a method for evaluating the operability of household electrical appliances and the like, protocol analyses have been used. According to the protocol analyses, an evaluator asks several users to try a certain type of appliances at the same time. While they are actually using the appliances, the evaluator videotapes it to analyze operational problems later, based on the time the users spent for each operation, their embarrassment, and their conversation. In addition, evaluators sometimes questionnaire a lot of users on the operability of their appliances.

Consequently, how users handle appliances has been generally known through such protocol analyses and questionnaires on similar types of products and old-fashioned types of products.

FIG. 2 shows the surveyed results on the using frequency of different functions provided to a washing machine, depending on users' ages and whether they are housewives or not. In fact the results would change depending on the latitude and temperature of where they live, users nationality, seasons, and the like.

FIG. 3 shows a list of the average operation time of each operational part included in a home washing machine. Other lists which include the types and locations of operational parts are also used.

Furthermore, Japanese Laid-open Patent Applications Nos. 3-14076, 4-302029, and 5-241811, and a report of the 7th Symposium on Human Interface Oct. 23-25, 1991 have proposed to realize operator-system interactive operations and the recording of the operations of appliances or systems provided with a micro processor, micro computer, or the like, thereby judging consistency or redundancy of users' operations, or evaluating their operability.

However, protocol analyses and questionnaires require completed appliances for users to actually use, so that unfinished appliances cannot be evaluated with these methods.

Furthermore, various prototypes at the designing stage must be produced to evaluate various kinds of operability; however, the production of such prototypes is limited in terms of cost and time.

In addition, the protocol analyses depend on the subjectivity of analysts and require experience, and questionnaire is troublesome.

In the method for evaluating the operability of systems provided with a micro computer or the like by realizing operator-system interactive operations, appliances to be targeted and the contents of the operations are limited.

In addition, to develop evaluation systems are laborious. Effective data are not necessary obtained at the designing stage of appliances.

Little consideration has been taken about operability in accordance with users' ages or life styles.

The protocol analyses results or questionnaire results on the same type of appliances, similar types of appliances, or old-fashioned types of appliances are often used, but they are not always used in an appropriate manner.

SUMMARY OF THE INVENTION

In view of the foregoing problems, the first object of the present invention is to provide a method and apparatus for evaluating the operability of appliances at the designing stage, which allows designers to obtain desired evaluation results of the operability.

The second object of the present invention is to provide a method and apparatus for evaluating the operability of appliances, which allows designers to detect defects in design, to enlarge the size of a frequently-used operational part, to reduce the number of operations, or the like at the designing stage.

The third object of the present invention is to provide a method and apparatus for evaluating the operability of appliances, which requires less experience, less time, less trouble, and less cost, and which has a less limitation on the types of the appliances to be intended for and on the contents of the operations.

The fourth object of the present invention is to provide a method and apparatus for evaluating the operability of appliances, the operability being based on users' ages, life styles, and the like.

The fifth object of the present invention is to provide a method and apparatus for evaluating the operability of appliances, which can utilize the evaluation results on the operability of the same type of appliances, similar types of appliances, and old-fashioned types of appliances.

The sixth object of the present invention is to provide an apparatus which can improve the operability of appliances, based on evaluated operability.

The seventh object of the present invention is to provide a method and apparatus for evaluating the operability of appliances, whose performance can be improved by utilizing information on most appropriate operability.

The first, second, and third objects can be achieved by a method for evaluating operability of a completed appliance at a designing stage, comprising the steps of: forming a function-operation correspondence table which includes functions that the completed appliance is supposed to have, operational parts to exert each of the functions, and a number of times each of the operational parts is actuated to exert each of the functions; finding a total number of times each of the operational parts is actuated to exert all the functions in a case where all the functions are selected one time each, by using the function-operation correspondence table; adding up all the total numbers of times; calculating a ratio of the number of times each of the operational parts is actuated to the total numbers of times all the operational parts are actuated to exert all the functions; finding any unbalance of using frequencies among the operational parts, from the calculated ratio and the number of the operational parts; and evaluating the operability of the appliance, based on the unbalance found.

These objects also can be achieved by a method for evaluating operability of a completed appliance at a designing stage, comprising the steps of forming a function-operation correspondence table which includes functions that the completed appliance is supposed to have, operational parts to exert each of the functions, and a number of times each of the operational parts is actuated to exert each of the functions; finding a total number of times each of the operational parts is actuated to exert all the functions in a case where all the functions are selected one time each, by using the function-operation correspondence table; adding up all the total numbers of times; forming a data base from protocol analyses and/or questionnaire, the data base including an average operation time required to actuate each of the operational parts; finding an average operation time required to actuate each of the operational parts in a case where all the functions are selected one time each, by multiplying the number of times each of the operational parts is actuated by the average operation time of each of the operational parts; adding up the total average operation times of all the operational parts; calculating a ratio of the average operation time of each of the operational parts to the total operation times of all the operational parts; finding any unbalance of using frequencies among the operational parts, from the calculated ratio and the number of the operational parts; and evaluating the operability of the appliance, based on the unbalance found.

These objects also can be achieved by an apparatus for evaluating operability of a completed appliance at a designing stage, comprising: a table storing unit for storing a function-operation correspondence table which indicates functions that the completed appliance is supposed to have, operational parts with which an operator selects each of the functions, and a number of times the operator actuates each of the operational parts to select the functions; an actuation number finding unit for finding a total number of times the operator actuates each of the operational parts in a case where all the functions are selected one time each, by using the function-operation correspondence table; an adding unit for adding up the total number of times the operator actuates all of the operational parts; a calculating unit for calculating a ratio of the number of times the operator actuates each of the operational parts to a total number of times the operator actuates all of the operational parts; a frequency finding unit for finding unbalance of using frequencies among the operational parts, from the calculated ratio and the number of the operational parts; and an outputting unit for evaluating the operability of the appliance, based on the unbalance found, and outputting evaluation results in a predetermined manner.

The fourth object can be achieved by a method for evaluating operability of a completed appliance at a designing stage, comprising the steps of: forming a function-operation correspondence table which includes functions that the completed appliance is supposed to have, operational parts to exert each of the functions, and a number of times each of the operational parts is actuated to exert each of the functions; forming a data base from surveyed data, the data base including a frequency at which each of the functions are selected in accordance with an operator's age, sex, physical features, address, and the like; selecting a type of the operator from the data base; calculating a ratio of a number of times to actuate each of the operational parts to a total number of times to actuate all of the operational parts in a case where the functions are selected at the frequency corresponding to the selected type of the operator, by using the function-operation correspondence table and the data base; finding unbalance of using frequencies among the operational parts by the selected type of the operator, from the calculated ratio and the number of the operational parts; and evaluating the operability of the appliance, based on the unbalance found.

The fourth object also can be achieved by a method for evaluating operability of a completed appliance at a designing stage, comprising the steps of: forming a function-operation correspondence table which includes functions that the steps of: selecting a plurality of appliances which have one of at least one different operational part from each other and a common operational part whose number of operations to be actuated to exert the common functions are different from each other; selecting at least one of the common functions to use for comparing the operability of the selected appliances; inputting names of operational parts and the number of times to actuate the operational parts in order to exert each of the selected functions; inputting an average operation time required for actuating each of the inputted operational parts; finding an operation time required for exerting each of the selected functions, based on the operational parts inputted, the number of times inputted, and the average time inputted; and comparing the operability of the appliances, based on the operation time for each of the selected functions.

The object also can be achieved by a method for evaluating operability of a completed appliance intended for a specific type of operators, at a designing stage, comprising the steps of: providing each operational part of the appliance with a terminal which outputs an identification signal for identifying the operational part and an operation time of the operational part when an operator actuates the operational part; connecting the terminal to an output means and CPU, and informing the CPU of each operational part actuated by the operator and an operational time of the operational part as a pair; actuating each of the operational parts by the specific completed appliance is supposed to have, operational parts to exert each of the functions, and a number of times each of the operational parts is actuated to exert each of the functions; forming a data base from surveyed data, the data base including a frequency at which each of the functions are selected in accordance with an operator's age, sex, physical features, address, and the like; forming a data base from surveyed data, the data base including an average operation time of each of the operational parts in accordance with the type of the operator; selecting a type of the operator; calculating at least one of a ratio of the number of times to actuate each of the operational parts to the total number of times to actuate all the operational parts and a ratio of an operation time required to actuate each of the operational parts to a total operation time required to actuate all of the operational parts in a case where the functions are selected at the frequency in accordance with the selected operator's type, by using the function-operation correspondence table and at least one of the data on the function using frequency and the data on the average operation time; finding unbalance of operation times among the operational parts, from the calculated ratio; and evaluating the operability of the appliance, based on the unbalance found.

The fifth object can be achieved by a method for evaluating operability of a plurality of completed appliances having common functions, at a designing stage, comprising the type of operators to sequentially exert functions to be provided to the completed appliance; forming a function-operation correspondence table on which each of the functions is associated with operational parts required to exert the function and a number of operations to actuate each of the operational parts; and adding at least one of a total operation time required for the specific type of operators to exert all the functions and a total operation time required for the specific type of operators to actuate all the operational parts to the function-operation correspondence table formed; and evaluating the operability of the appliance for the specific type of operators in terms of at least one of the operation times of the functions required to exert the functions and the operation times required to actuate the operational parts, based on the function-operation correspondence table formed.

The sixth and seventh objects can be achieved by an apparatus for improving operability of an appliance, the apparatus having a plurality of functions and being operated with a plurality of operational parts, comprising: an operational part storing unit for storing data of each of the operational parts, the data including a position, size, and shape of each of the operational parts associated with the operators conditions such as age and sex, to display operational parts required for exerting a function desired by the operator; an operator information reception unit for receiving information on the operator's type including an age and sex through an inputting operation of the operator; a display control unit for reading data corresponding to the type of the operator from the operational part storing unit; a display unit for displaying a name of at least one of the operational parts, based on the operator's type read by the display control unit; an operation detecting unit, which is transparent and provided in front of the display unit, for detecting a coordination of a position that the operator touches; an identifying unit for identifying an operational part corresponding to the detected coordination, by referring to the data read by the display control unit; and a transferring means for transferring an operating signal corresponding to the identified operational part to the appliance.

The operator information reception unit may comprise a question storing unit for storing at least one question to determine the type of the operator and at least one answer to the at least one question; a question sequence storing unit for storing a relationship between the answer received from the operator and a next question; a question-answer display control unit for reading from the question storing unit at least one of the at least one question and the at least one answer;a question-answer display unit for displaying at least one of the at least one question and the at least one answer read from the question-answer display control unit; an answer detecting unit, which is transparent and provided in front of the question-answer display unit, for detecting a coordination of a position that the operator touches; an answer identifying unit for identifying an answer designated by the operator from among a plurality of answers displayed on the question-answer display unit, the answer identified corresponding to the coordination detected, based on the questions and answers read by the question-answer display control unit; a question control unit for controlling the question-answer display control unit to display a first question stored in the question storing unit and to display a next question depending on the operator's answer and according to the relationship stored in the question sequence storing unit, and for recognizing a completion of questioning; and an operator type determining unit for determining the type of the operator based on the answer received when the question control unit has been completed the questioning, and informing the display control unit of the completion.

DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is the surveyed results on the using frequency of the functions, depending on users' ages and whether they are housewives or not.

FIG. 3 is a list of the average operation time of each operational part included in a home washing machine.

FIGS. 6A, 6B, and 6C are is a push-button actuations required for each function.

FIG. 7 is a function-operation correspondence table.

FIG. 8 is a table showing the ratio of the total number of times to actuate each button to the total number of times to actuate all the buttons.

FIG. 10 is a table showing the function use ratios of each of the functions.

FIG. 11 is a table showing the ratio of the weighted number of times to actuate each operational part to the total weighted number of times to actuate all the operational parts.

FIG. 12 is a table showing the average operation time of each of the functions.

FIG. 13 is a table showing the ratio of the expected operation time of each function to the total expected operation times of all the functions.

FIG. 15 is a table showing the ratio of the weighted expected operation time for each function to the total weighted expected operation time for all the functions.

FIG. 16 is a function-operation correspondence table.

FIG. 17 is a table showing the expected operation time of each of the functions.

FIG. 24 shows the transition of the contents being displayed on the apparatus of the eighth embodiment.

FIG. 26 shows an initial display of operational parts appeared in the display unit and another display appeared in process of operation of the operation apparatus provided to a washing machine.

DESCRIPTION OF THE PREFERRED EMBODIMENTS

The embodiments of the present invention will be detailed as follows with reference to the attached drawings.

<EMBODIMENT 1>

In the method and apparatus for evaluating the operability of appliances according to the present embodiment, first of all, a function-operation correspondence table as shown in FIG. 7 is formed. The table shows each of the functions and each of the operational parts to be provided to an appliance and the number of times operators actuate each of the operational parts to select each function.

Figure 4:
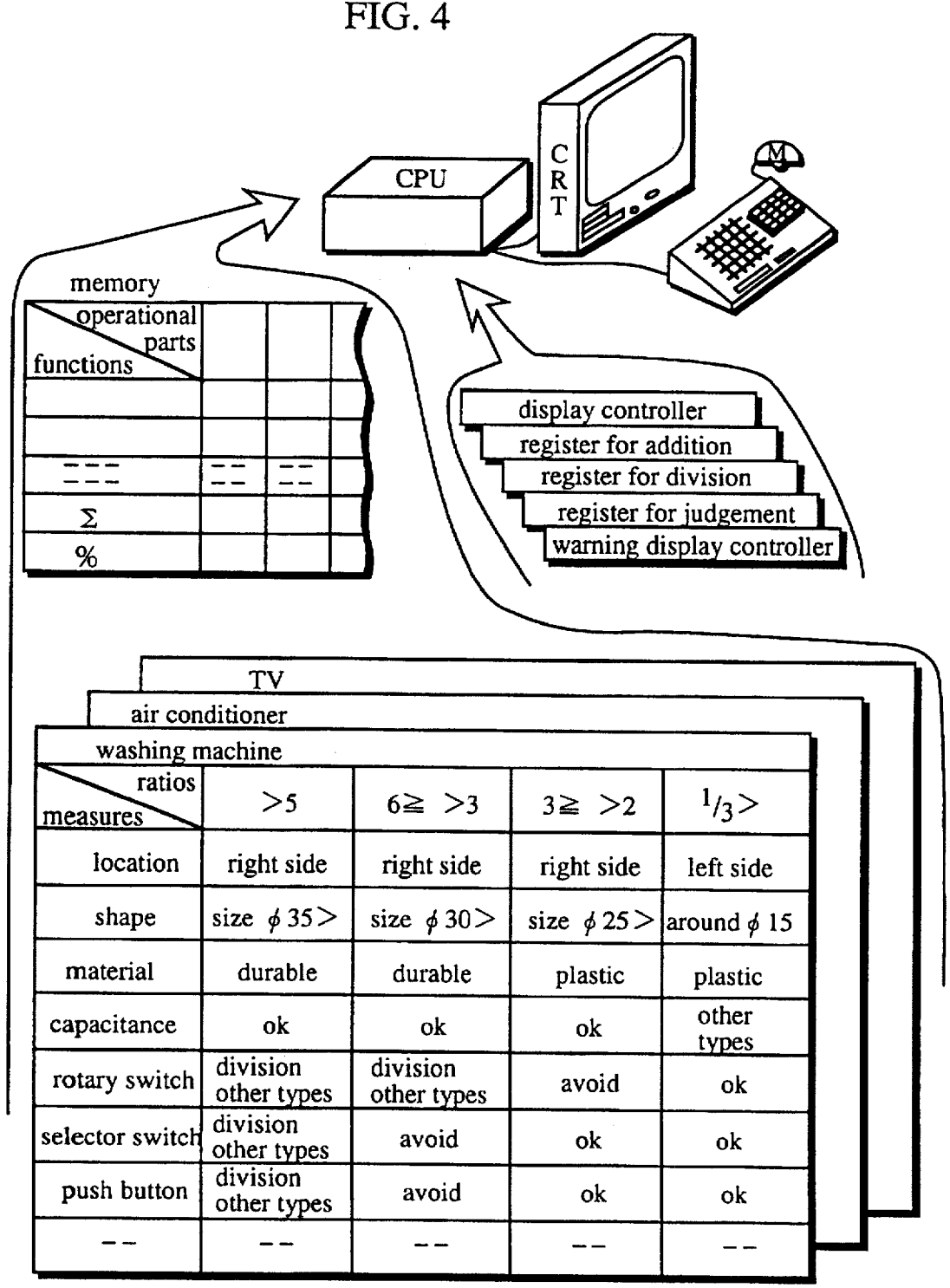
FIG. 4 is an overall construction of the apparatus of the first embodiment for evaluating the operability of appliances.
Figure 5:
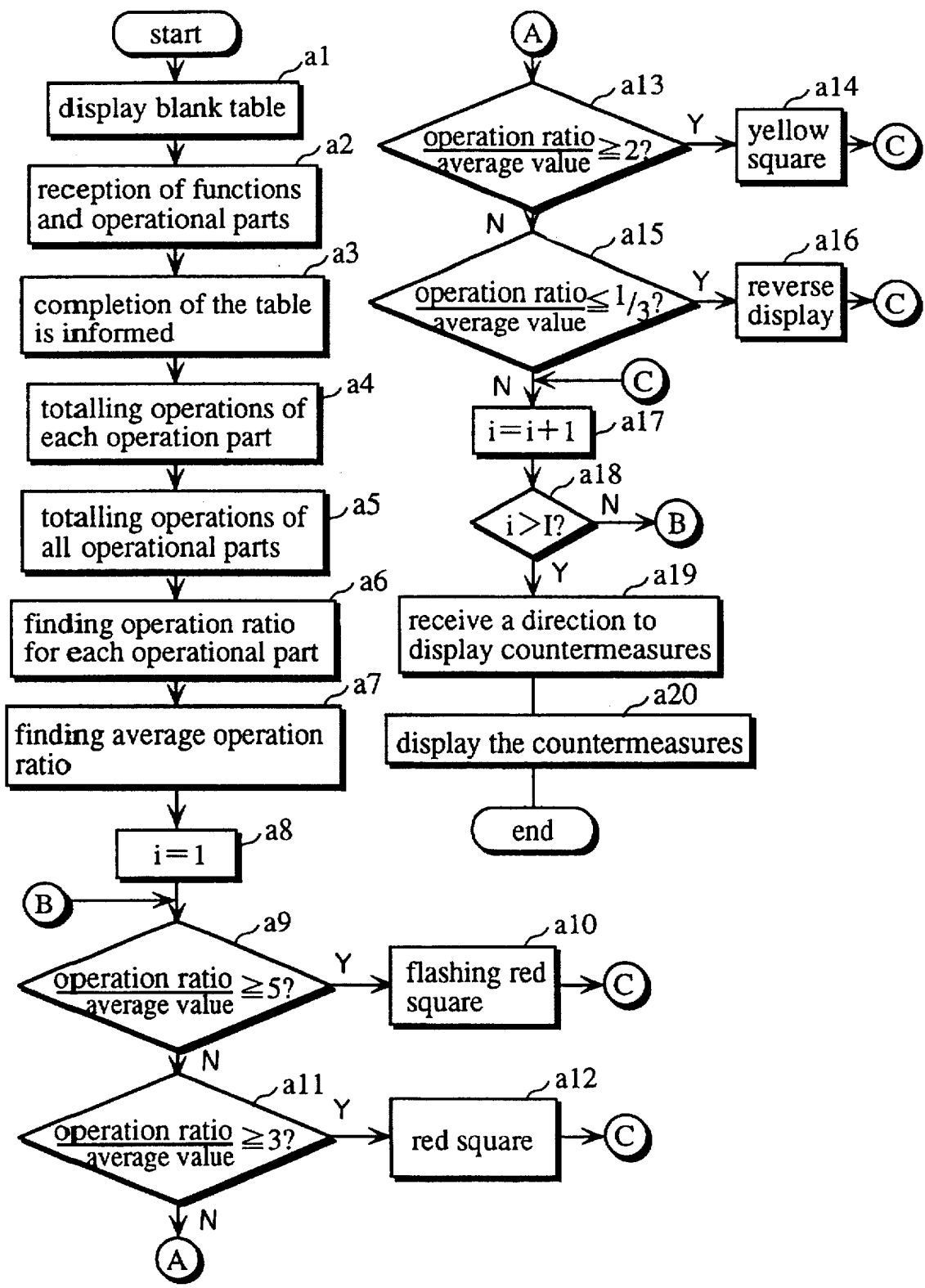
FIG. 5 is a flowchart depicting the procedures of the apparatus of the first embodiment.

FIG. 4 shows an overall construction of the apparatus of the present embodiment for evaluating the operability of appliances, and FIG. 5 shows a flowchart which depicts the procedures of forming the function-operation correspondence table and displaying countermeasures against operational problems.

As shown in FIG. 4, the apparatus is composed of a CPU, a CRT, a keyboard, a mouse, and the like. The memory in the CPU holds a blank table for completing the function-operation correspondence table and a data base for coping with operational problems. The CPU includes a display controller, a register for addition, a register for division, a register for judgement, and a warning display controller.

The appliance designer takes these procedures (1)–(4) prior to the formation of the function-operation correspondence table.

(1) The appliance designer studies which functions should be provided to an appliance being developed, based on the results of questionnaire or a survey on sales of similar types of appliances.

(2) The appliance designer studies the available hardware for exerting the functions provided to the appliance. The hardware includes the capacity and type of a motor, the capacity of a memory and a register, electrical wiring and circuits, the shape and size of the appliance, and the like.

(3) The appliance designer studies what kind of actuation the users must do to the operational parts in order to exert the functions.

(4) The appliance designer determines the contents of actuation.

Then, the function-operation correspondence table is formed as follows as shown in the flowchart of FIG. 5.

(a1) The blank table for the function-operation correspondence table is displayed on the CRT.

(a2) The names of functions and operational parts, and the number of operations of the operational parts are received from the appliance designer: the columns indicate functions and the rows indicate operational parts. The number of times users actuate each of the operational parts to exert each of the functions are filled in.

(a3) The completion of the formation of the function-operation correspondence table is informed.

(a4) The number of times users actuate each of the operational parts to exert each of the functions is calculated.

(a5) All the number of times calculated are totalled to obtain the total number of times users actuate all the operational parts to exert all the functions.

(a6) The ratio of the number of times to actuate each of the operational parts to the total number of times to actuate all the operational parts is calculated. The ratio is under the conditions that all the functions are selected for one time each.

(a7) The average value of the ratios is obtained by dividing the total number of times to actuate all the operational parts by the total number of the operational parts.

Then, in accordance with a predetermined program, the CPU gives a predetermined warning to an operational part that has either the highest ratio of operations, a ratio more than a threshold value, or the lowest ratio of operations.

To be more specific, (a8) The operation part number is set at "1"

(a9, a10) The box of an operational part having five times as high a value as the average value is shown as a flashing red square. When the ratio of the operation ratio to the average value is less than 5:1 in step a9 (a9:No in FIG. 5), the processing proceeds to a11.

(a11, a12) The box of an operational part having three times as high a value as the average value is shown as a red square. When the ratio of the operation ratio to the average value is less than 3:1 in step a11 (a11:No in FIG. 5), the processing proceeds to a13.

(a13, a14) The box of an operational part having twice as high a value as the average value is shown as a yellow square. When the ratio of the operation ratio to the average value is less than 2:1 in step a13: No in FIG. 5), the processing proceeds to a15.

(a15, a16) The name of an operational part having one-third as high a value as the average value is shown in a reversed display. When the ratio of the operation ratio to the value is greater than 1⅓ in step (a15:No in FIG. 5), the processing proceeds to a17.

(a17, a18) The operation part number i is incremented by one and it is judged whether the operation part number i has exceeded the operation part total number I, in which case (a18:Yes) the processing proceeds to a19, while when it has not exceeded the operation part total number I (a18:No), the processing returns to a9. These procedures are applied to all the operational parts. As a result, the appliance designer can see unbalanced operation times among the operational parts.

(a19) The appliance designer suggests to display appropriate countermeasures to be applied to the operational parts having too high or too low using frequency.

(a20) The suggested countermeasures are displayed. Then, the appliance designer evaluates the operability of the warned operation parts, and copes with the evaluation results.

To be more specific, (i) A selector switch is trouble-prone, so that in the case it is shown in a red or a flashing red square, the operational system is checked, one more switch is provided, or stainless is used for the switch instead of plastic.

(ii) A push button is also trouble-prone, so that in the case it is shown in a flashing red square, its function is shared with another push button.

(iii) The use of a selector switch as an operational part shown in a yellow square is avoided as much as possible.

(iv) An operational part having one-third as high value as the average value is made of plastic as much as possible.

(v) An operational part with a high using frequency is positioned on the right side and toward the front, and also formed as large as possible.

(vi) The designs for functions or circuits are reviewed as necessary.

As information for coping with these cases, the CPU beforehand stores guidance tables which offer guidance for all kinds of warnings depending on the types of appliances and operational parts, and the ratios of operations.

Consequently, the appliance designer can input the calculated ratios of operations, the types of the operational parts to be provided to the appliance to be designed, and the type of the appliance, thereby taking countermeasures in accordance with the guidance of the function-operation correspondence table.

The important points of these procedures are explained as follows, by taking a washing machine as an example.

The washing machine of the present embodiment offers three functions: (A) a wash mode consisting of one wash and two rinses, (B) a water-save wash mode consisting of one wash, one rinse, and one spin-dry, and (C) a rinse mode consisting of one rinse and one spin-dry. The push-button actuation required for each function is shown in FIGS. 6A, 6B, and 6C.

FIG. 7 is a function-operation correspondence table, which shows these functions A, B, and C, and also shows operational parts: a rinse button, a wash button, and a spin-dry button, which are respectively referred to as button 1, button 2, and button 3. The table indicates that the function A requires the button 1 to be actuated two times and the button 2 one time, the function B requires the buttons 1, 2, and 3 to be actuated one time each, and the function C requires the buttons 1 and 3 to be actuated one time each.

Then, the ratio of the total number of times to actuate each operational part to the total number of times to actuate all the operational parts is calculated. In the case shown in FIG. 7, the number of times to actuate the buttons 1, 2, and 3 is calculated.

FIG. 8 is a table showing the total number of times to actuate each of the buttons 1, 2, and 3 in order to exert all the functions A, B, and C, and the ratio of the total number of times to actuate each button to the total number of times to actuate all the buttons. For example, the button 1 is actuated 4 times in all, so that the ratio of the number of times to actuate the button 1 to the total number of times to actuate all the buttons 1, 2, and 3 turns out to be 0.50. In the same manner, the ratio of the number of times to actuate the buttons 2 and 3 to the total number of times to actuate all the buttons turns out to be 0.25.

The table indicates that the button 1 is actuated twice as frequently as the buttons 2 and 3. Consequently, the evaluation results indicate that if the target of the appliance is users who use all the functions evenly, then various information can be obtained to improve the operability of the button 1. For example, the button 1 can be twice as big or touch-sensitive as the buttons 2 and 3, be made of a durable material, or be painted in a prominent color.

In other words, it becomes possible to quantitatively evaluate the operability of different types of appliances having different functions in the same manner at the designing stage, and further to specify an operational part having high or low frequency of use in the conditions that all the functions are selected evenly. As a result, operational defects can be found early and the size of operational parts having high using frequency can be enlarged at the designing stage.

Besides washing machines, the apparatus and method of the present embodiment can be applied to other electric appliances. In the case of air conditioners, for example, the three functions can represent high, medium, and low cooling modes, and the buttons can be a cooling switch, a fan switch, and a dehumidifying switch. The high cooling mode can be obtained by rotating the cooling switch further, a ventilating fan is started by rotating the fan switch, and dehumidification can be started by rotating the dehumidifying switch.

Although the washing machine of the present embodiment is provided only three functions to make the explanation simple, there can be larger number of functions. Instead of then buttons, dials or slide switches can be applied as operational parts as well.

<EMBODIMENT 2>

In the method and apparatus for evaluating the operability of appliances according to the present embodiment, the evaluation is based on the ratio of the weighted number of times users actuate each operational part to the total weighted number of times users actuate all the operational parts. In other words, the present embodiment takes it into account that functions and operational parts to be selected depend on the users, locations of the appliance, and other conditions. Therefore, the present embodiment is focused on this point.

Figure 1:
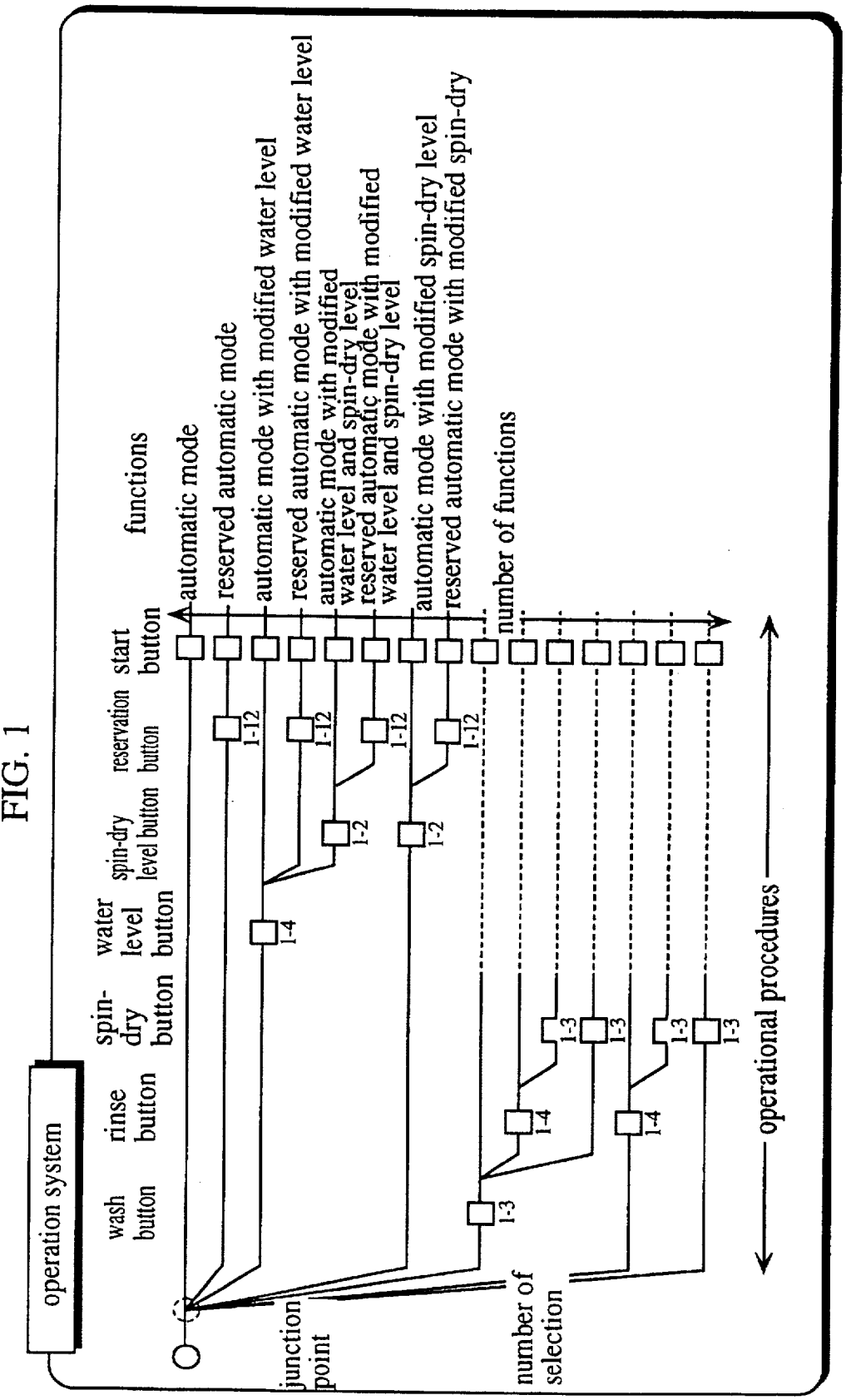
FIG. 1 is a diagram showing functions provided to a washing machine and buttons necessary to exert the functions.

First of all, the function-operation correspondence table shown in FIG. 1 is formed in the same manner as the first embodiment.

Figure 9:
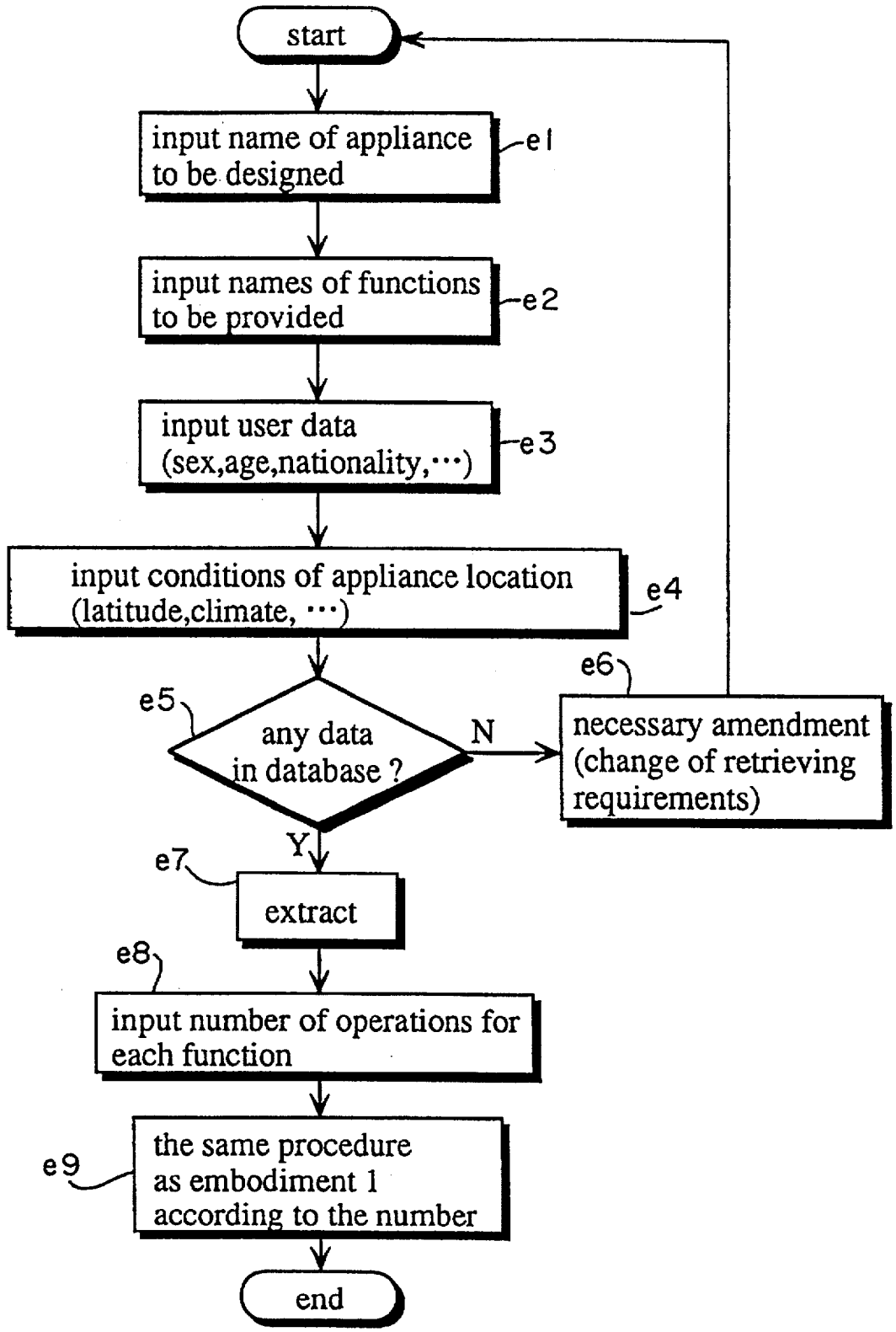
FIG. 9 is a flowchart depicting the procedures before the input of weight in accordance with the contents of operations according to the second embodiment.

FIG. 9 is a flowchart depicting the procedures before the input of weight in accordance with the contents of operations. In the present embodiment, a data base is used to determine the ratio of the weighted number of times to actuate each operational part to the total weighted number of times to actuate all the operational parts. The designer inputs the appliance name e1, functions e2, user data e3, and intended geographical area of use e4. A search is made of the database e5 and any amendments to search field e6 would return to start position. Data is extracted e7 and the number of operations e8 for the indicated function can be added. The procedure set forth in FIG. 5 can be applied e9.

The evaluation of the operability of a washing machine proceeds as follows in accordance with the procedures.

It is assumed that a male office worker who lives in the tropics selects the functions A, B, and C so that the function use ratios of these functions are respectively 0.2, 0.2 and 0.6 as shown in FIG. 10. Each of the values is multiplied by the number of times to actuate each operational part shown in FIG. 7, to obtain the weighted number of times to actuate each operational part. Then, the ratio of the weighted number of times to actuate each operational part to the total weighted number of times to actuate all the operational parts is calculated as shown in FIG. 11.

In FIG. 11 the weighted number of times to actuate the button 1 to exert the function A turns out to be 0.4, which is obtained by multiplying the function A's function use ratio 0.2 by the number of times to actuate the button 1, which is 2 times. As for the button 2, the weighted number of times to actuate the button 2 to exert the function A turns out to be 0.2, which is obtained by multiplying the function A's function use ratio 0.2 by the number of times to actuate the button 2, which is 1 time. The similar calculations are carried out for the functions B and C.

The total weighted number of times the button 1 is actuated to exert all the functions is 1.2, and the ratio of the total weighted number of times the button 1 is actuated to exert all the functions to the total weighted number of times all the buttons are actuated to exert all the functions turns out to, be 0.5. In the same manner, the ratios of the weighted numbers of times the button 2 and button 3 are actuated to exert all the functions to the total weighted number of times all the buttons are actuated to exert all the functions are 0.17 and 0.33, respectively.

These values obtained are under the conditions that each of the buttons are actuated in accordance with the function use ratios. To be more specific, the users use the button 1 three times as often as the button 2, and 1.5 times as often as the button 3. The evaluation results can be reflected on the operability of the button 1 by designing it to be three times as large as the button 2 and 1.5 times as touch-sensitive as the button 3.

Needless to say, the using frequency of these buttons and their positions and shapes are supposed to be changed depending on the type of users to be targeted.

For example, washing machines intended for housewives are seldom required to use a rinse mode consisting of one rinse and one spin-dry. In the case of air conditioners, the selection of the three cooling modes: high, medium, and low greatly depends on the atmospheric temperature, and especially on the latitude of where users use the air conditioners.

In short, in a case where an appliance is designed to meet the frequency that a specific type of users use each operational part, an operational part having higher or lower using frequency can be quantitatively specified. As a result, the life style of the users can be reflected to the operational index of the operational parts.

However, even if an operational part of an appliance has a high using frequency, if the main users of the appliance are young men, then the operational part does not need to be very touch-sensitive. If the main users are older people, on the other hand, then the operational part can be designed to be larger and touch-sensitive.

<EMBODIMENT 3>

In the method and apparatus for evaluating the operability of appliances according to the present embodiment, the evaluation is done by calculating the ratio of the expected operation time to exert each function to the total expected operation time to exert all the functions. For this purpose, a table as shown in FIG. 12 is used to show the average time required for users to actuate each operational part. FIG. 12 shows that the average times required for users to actuate the buttons 1, 2, and 3 are 2 sec., 4 sec., and 6 sec., respectively.

First of all, the function-operation correspondence table shown in FIG. 7 is formed in the same manner as the first embodiment. Then, the number of times users actuate each operational part to exert each function shown in FIG. 7 is multiplied by the average operation time of the corresponding operational part shown in FIG. 12. As a result, the ratio of the expected operation time of each function to the total expected operation times of all the functions is obtained as shown in FIG. 13.

In FIG. 13, the expected operation time to actuate the button 1 to exert the function A (4 seconds) is obtained by multiplying the average operation time of the button 1 (2 seconds) by the number of times to actuate the button 1 to exert the function A (2 times). In the same manner, the expected operation time to actuate the button 1 to exert the function B (2 seconds) is obtained by multiplying the average operation time of the button 1 (2 seconds) by the number of times to actuate the button 1 to exert the function B (1 time). In the same manner, the expected operation time to actuate the button 1 to exert the function C (2 seconds) is obtained by multiplying the average operation time of the button 1 (2 seconds) by the number of times to actuate the button 1 to exert the function C (1 time). The same calculation is carried out for the buttons 2 and 3.

Then, the total expected operation time of the function A (8 seconds) is obtained by adding up the expected operation time for the button 1 (4 seconds) and the expected operation time for the button 2 (4 seconds). In the same manner, the total expected operation times for the function B and function C turn out to be 12 seconds and 8 seconds, respectively. Finally, the ratio of the total expected operation time for the function A (8 seconds) to the total expected operation times for all the functions A–C (28 seconds) is calculated, which turns out to be 0.29 seconds. In the same manner, the ratios of the total expected operation times for the function B and C to the total expected operation times for all the functions A–C are calculated, which turn out to be 0.43 seconds and 0.29 seconds, respectively.

The ratios are obtained in the conditions that all the functions are selected evenly, and the function B requires 1.5 times as long operation time as the functions A and C. The evaluation results can be used as designing information to reduce the number of operations to exert the function B, which leads to the reduction of its operation time.

Figure 14:
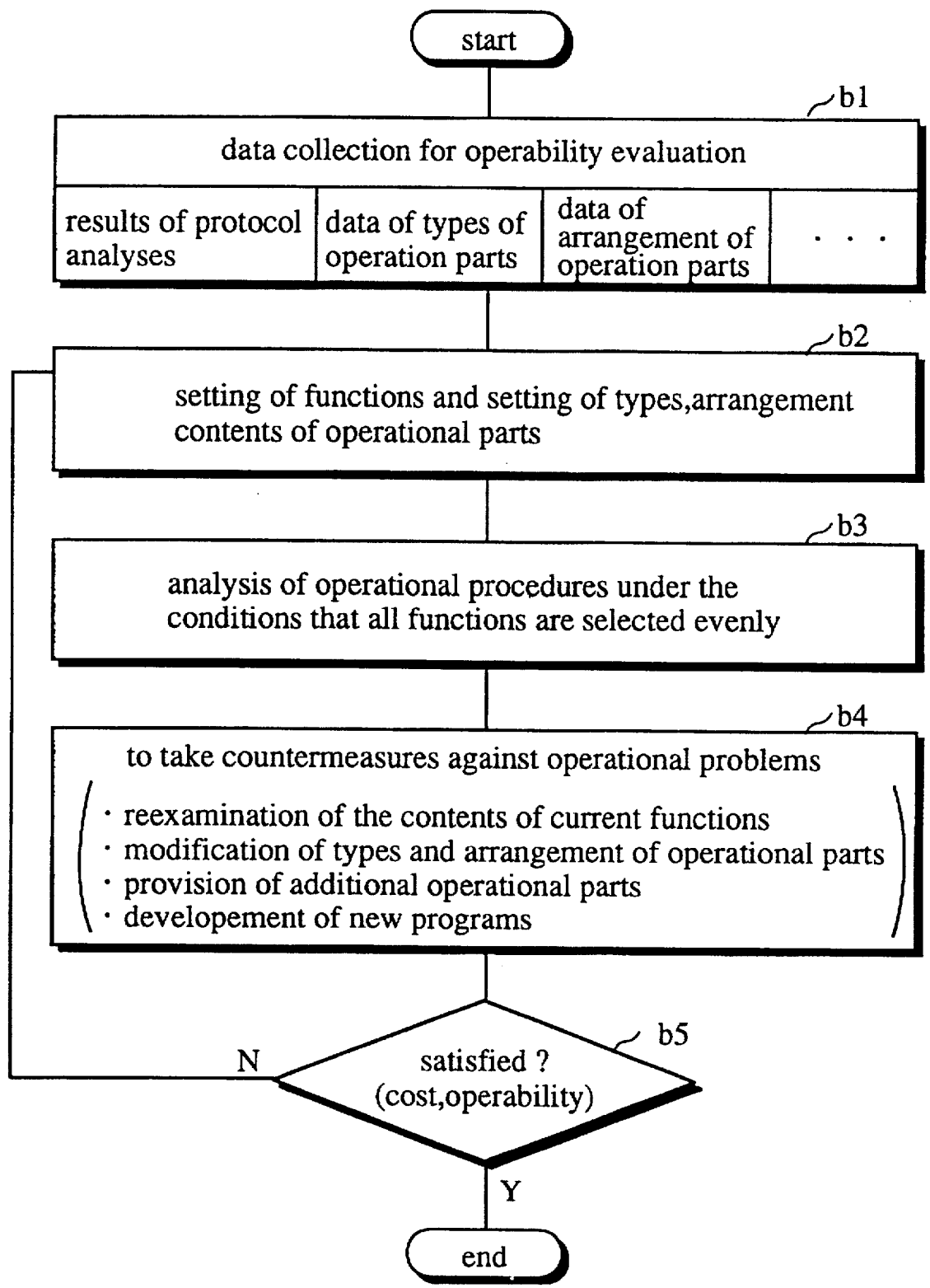
FIG. 14 is a flowchart showing the evaluation procedures of the present embodiment.

In the case of washing machines or air conditioners to be used in deluxe liners which travel all over the world, users and circumstances are fairly diverse, so that it is hard to predict the using frequently of each function. In addition, in the case of micro computers, word processors with micro computers, or new types of cooking appliances, it is hard to predict the using frequency of some of the functions. Consequently, the operability of such appliances is designed on the assumption that all the functions are used evenly. Since it is possible to quantitatively specify a function demanding longer or shorter operation time, it becomes possible to reduce the number of operations required to exert the function having longer operation time, to use a button of easy operation, to locate a button at a position of easy use, or to develop a special program. FIG. 14 is a flowchart showing the evaluation procedures of the present embodiment.

The evaluation procedures proceed as follows.

(b1) The designer of an appliance collects data on the operability evaluation.

(b2) The designer determines functions to be provided to an appliance which is being designed. The collected data are inputted.

(b3) The designer analyzes the operation procedures in a case where all the functions are selected evenly.

(b4) The designer takes countermeasures against operational problems.

(b5) The designer examines the operability and changes its design as necessary.

This is to say, when the designer is not satisified (5:No), the processing returns to step b2, while when the designer is satisfied, the processing is completed.

<EMBODIMENT 4>

In the method and apparatus for evaluating the operability of appliances of the present embodiment, the ratio of the expected operation time for each function to the total expected operation time for all the functions is used for specified groups of users, such as the aged, the disabled, left-handed people, or the like.

First of all, the function use ration of each function is found. The functions frequently selected by these specific groups of users are different from those selected by ordinary users, and the former takes more operation time to exert each function. Users which belong to a common group tend to require a similar amount of time to operate a common operational part of an appliance.

To be more specific, the rotary switches are hard to be operated by the aged, people with handicapped hands, or left-handed people, and characters printed on push buttons are hard to be seen by the aged or the people with impaired vision. Consequently, they take more time to actuate these operational parts than the ordinary users. The values shown in FIG. 10 are used in the present embodiment as data for the operability of the operational parts.

The expected operation time for each function is found in the same manner as the third embodiment as shown in FIG. 13.

Then, each of the expected operation time shown in FIG. 13 is multiplied by a corresponding value shown in FIG. 10 to find a weighted expected operation time. Then, the ratio of the weighted expected operation time for each function to the total weighted expected operation time for all the functions is obtained as shown in FIG. 15. In FIG. 15, the weighted expected operation time of the function A (1.6 seconds) is obtained by multiplying the function usage ratio (0.2) by the expected operation time (8 seconds). In the same manner, the function usage ratio of the function B (0.2) is multiplied by the expected operation time (12 seconds) to obtain the weighted expected operation time (2.4 seconds), and the function use ratio of the function C (0.6) is multiplied by the expected operation time (8 seconds) to obtain the weighted expected operation time (4.8 seconds).

Then, the ratio of the weighted expected operation time for the function A (1.6 seconds) to the total weighted expected times for all the functions A–C (8.8 seconds) is found to be 0.18. In the same manner, the ratios of the weighted expected operation times for the function B and the function C are found to be 0.27 and 0.55, respectively.

These values are obtained in the conditions that all the functions are selected evenly, and the function C requires three times as long operation time as the function A, and two times as long operation time as the function B. These evaluation results can be used as designing information to reduce the number of operations to exert the function C, which leads to the reduction of its operation time.

In a case where the number of operations cannot be reduced, the evaluation results can be used as designing information to make the operational part easier to operate.

To be more specific, to meet the needs of the aged or the disabled, the operational part can be larger and touch-sensitive, or selector switches may be replaced by push buttons as much as possible.

In short, in a case where an appliance is designed to meet the frequency at which a specific type of users use each operational part, an operational part having higher or lower using frequency can be quantitatively specified. As a result, the life style of the users can be reflected to the operational index of the operational parts.

<EMBODIMENT 5>

The method and apparatus for evaluating the operability of appliances of the present embodiment is directed to the comparison of the operability of an appliance with that of similar types of and old-fashioned types of appliances.

In recent years, as the development of micro computers and appliances with micro computers has surged forward, not only washing machines and air conditioners, but VTRs, TV sets, microwave ovens, word processors, and the like have been provided with a variety of functions. When brand new or improved appliances are put on the market, users regard the operability as an important factor to be compared, in addition to their functions and cost. However, the functions are diversified and the operations to exert the functions are also diversified, so that proper comparison of their operability has become a new issue.

The present embodiment is directed to solve the issue. The feature of the present embodiment is that the procedures used to obtain the expected operation time in the third embodiment are applied to a plurality of appliances to be compared. Therefore, the contents of the procedures and the construction of the appliance are the same as those of the third embodiment.

In the method and apparatus for evaluating the operability of a plurality of appliances according to the present embodiment, the expected operation time is found in the same manner as the third embodiment as shown in FIG. 13. Then, the expected operation times for the functions A, B, and C shown in FIG. 13, which are 8, 12, and 8 seconds, are added up to obtain the total expected operation times for all the functions, which is 28 seconds.

The appliance used in these embodiments 1–5 is referred to as the appliance X. Here, an appliance which is provided with the same functions and operational parts as the appliance X, but each of its operational parts has different number of operations from that of the appliance X is referred to as the appliance Y. FIG. 16 shows the function-operation correspondence table of the appliance Y. The expected operation time of the appliance Y shown in FIG. 17 is calculated by using the average operation time shown in FIG. 12 and the function-operation correspondence table. To be more specific, the expected operation times of the functions A, B, and C are 10 sec., 18 sec., and 6 sec., respectively. As a result, the total expected operation times of the appliance Y turns out to be 34 seconds.

The ratio between the total expected operation time of the appliance X and that of the appliance Y, which is 28:34, can be utilized as information to indicate that the appliance X can be operated more quickly than the appliance Y under the conditions that all the functions are selected evenly.

In addition, the information can be easily used to improve the operability. To be more specific, a button may be designed exclusively for a function which demands long operation time. For example, a microwave oven may be provided with a button designed exclusively for a function of cooking rice for Japanese users.

Thus, the operability of a plurality of appliances can be quantitatively compared and improved.

Instead of the total expected operation time, the total weighted expected operation time can be found as an index for relatively comparing the operation times.

Although the present embodiment shows the evaluation of the operability of only one operational part to make the explanation simple, the operability of a plurality of operational parts can be evaluated as long as it is quantitatively evaluated in the same manner as the present embodiment.

<EMBODIMENT 6>

Figure 18:
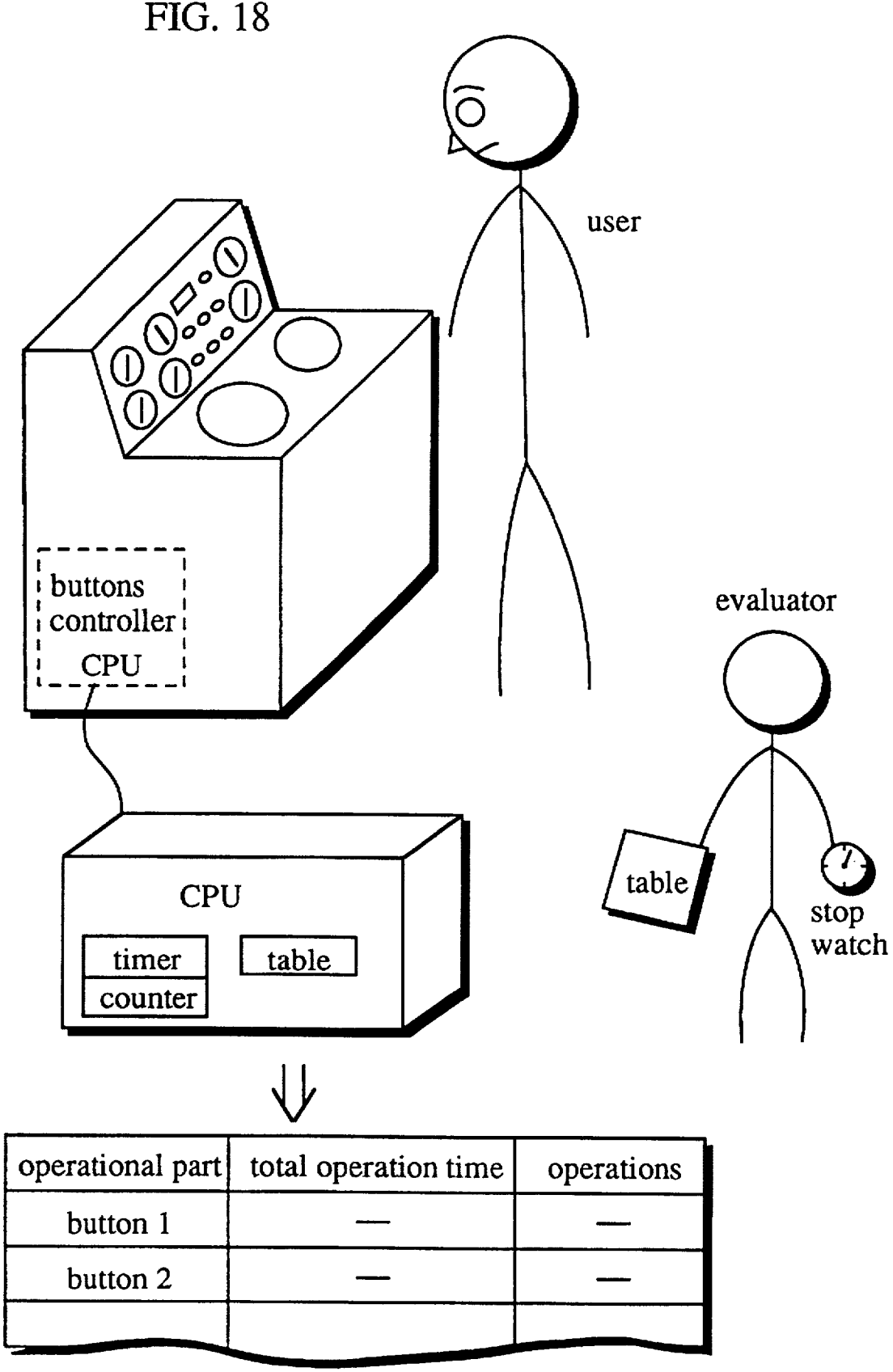
FIG. 18 is a construction of an appliance whose operability for a specified type of users is quantitatively measured.

The method and apparatus for evaluating the operability of appliances of the present embodiment are directed to quantitatively predict the operability of a newly-developed appliance, based on the experimented results on the operability of conventional appliances, when users who have equal operational skills use the newly-developed appliance. First of all, designers make users use a conventional appliance and measure the number of times the users actuate each operational part and the time the users spend to actuate each operational part. Then, the total operation time of all the operational parts is divided by the number of operations, to obtain the average operation time of each operational part as shown in FIG. 18. In FIG. 18, both the evaluator and the CPU connected to the appliance record data on the usage of the washing machine by the users. The CPU stores a table in which the number of operations and the total operation time for each operational part are filled in. The button controller sends a button identification signal to the CPU in response to the button actuation of the users while the operation is in process. On the other hand, the CPU recognizes the number of operations and the total operation time through its timer and counter, thereby filling in the table.

The evaluator, who observes the operations by the users, measures the operation time with a stop watch and fill in the table. The evaluator may videotape the operations by the users to form the table later.

Figures 19, 20:
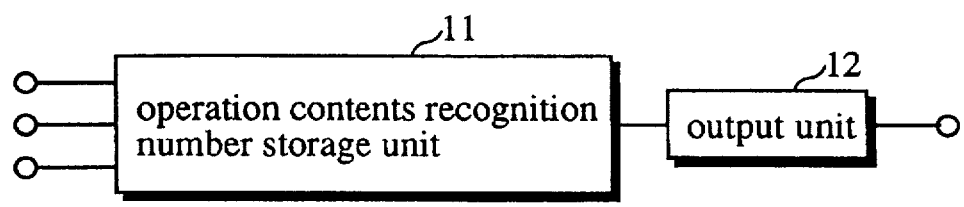
FIG. 19 is a table showing the average operation time of each of the operational parts.
FIG. 20 is the construction of apparatus for forming the function-operation correspondence table to be used to evaluate the operability of appliances.

FIG. 19 shows the contents of the table. In FIG. 19, the total operation time and the number of operations of the button 1 are 60 seconds and 20 times, respectively, so that the average operation time turn out to be 3 seconds. In the same manner, the average operation times of the buttons 2 and 3 are 2 seconds and 1 second, respectively.

These average operation times thus obtained indicate the labor of users to actuate each operational part, which reflects their skill, preferences, and the like.

The average operation times may be used in place of the operation times explained in the third, fourth, and fifth embodiments, to calculate the expected operation time of users of other appliances including developing appliances, to obtain the expected operation index of another appliance, which reflects the users preference more accurately.

In the present embodiment, the recognition of the buttons to be selected and the operation time in the automatic mode are dependent on the signal sent from the button controller. However, each button may be provided with a detection terminal to detect users' operations to make the CPU form the table, based on the signal sent from the terminal. The detection terminal may be a differential transformer, a detecting terminal with changing capacitance, or a sensing lever.

<EMBODIMENT 7>

The present embodiment is related to a method and apparatus for forming the function-operation correspondence table to be used to evaluate the operability of appliances. FIG. 20 shows the construction of the apparatus. The apparatus is provided with the operation contents recognition number storage unit 11 and the output unit 12. The operation contents recognition number storage unit 11 is composed of a plurality of counters or processors, and recognizes the contents of the operation of actuated operational part, and stores the names of the operational part and the number of operations. The output unit 12, which is composed of a printer, outputs the contents stored in the operation contents recognition number storage unit 11 in accordance with the direction of the analyst.

Figure 21:
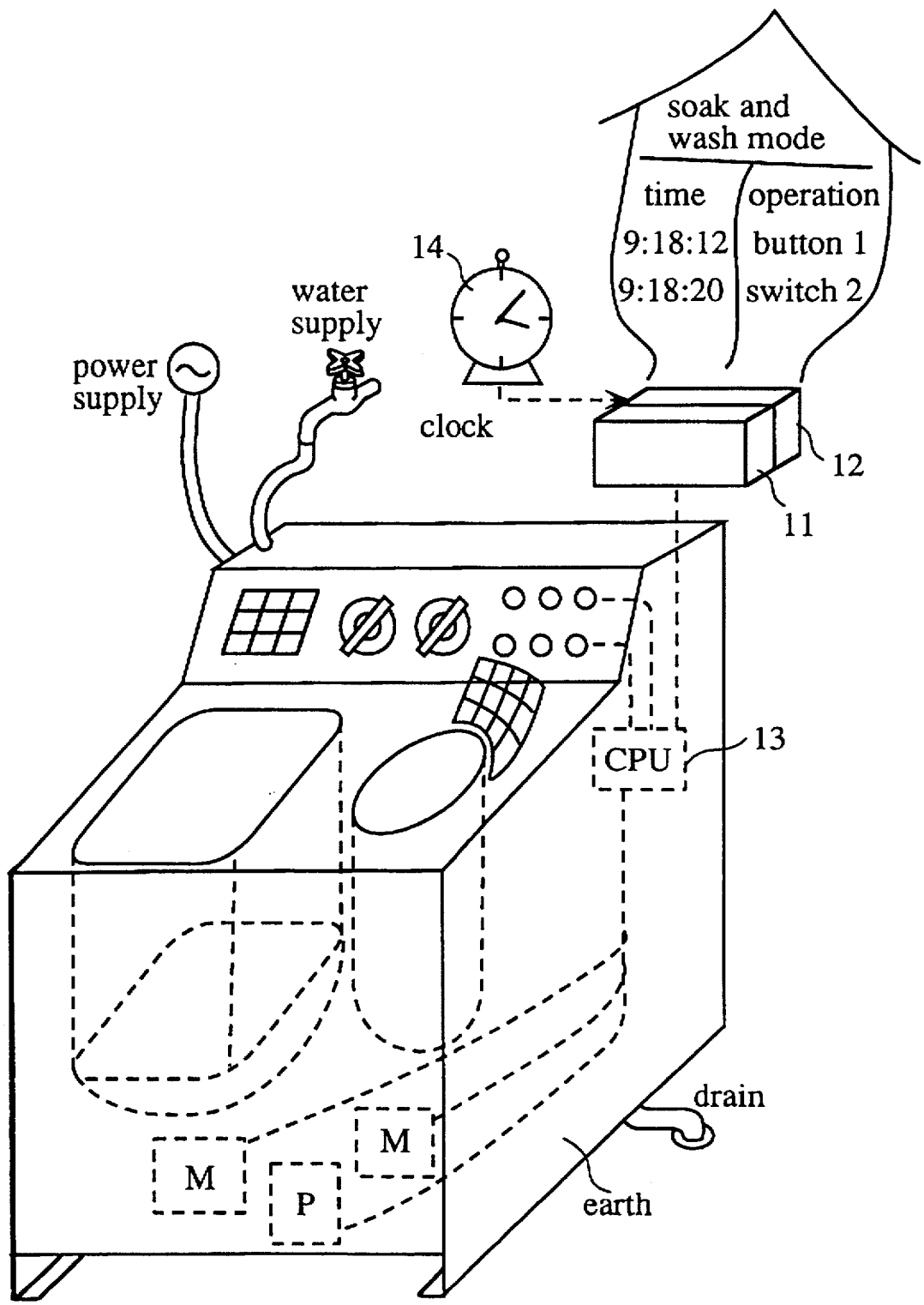
FIG. 21 shows how the apparatus for forming the function-operation correspondence table is fixed to the appliance.

FIG. 21 shows how the apparatus for forming the function-operation correspondence table is fixed to the appliance. In FIG. 21, the CPU 13 provided to the washing machine is connected to the operation contents recognition number storage unit 11 and further connected to the output unit 12. The CPU is also connected to the clock 14.

The apparatus of the present embodiment operates as follows.

When a user uses the washing machine, the operation contents recognition number storage unit 11 receives an electric signal from the computer of the appliance for every operation of an operational part, recognizes the contents, and accumulates and stores the number of operations per operational part. In addition, time information inputted from the clock 14 is also stored. At the moment where the function selection has been completed, the output unit 12 reads and outputs the contents stored in the operation contents recognition number storage unit 11 in accordance with the direction of the analyst, as shown in FIG. 21. Consequently, the number of operations of each operational part after the start of the function selection and before the completion of the function selection is outputted, and as a result, blanks in the area corresponding to the functions of the operational parts in the table are filled in. The entire table is completed by repeating these procedures until the selection of the functions is completed. The function-operation correspondence table can be used in the first through sixth embodiments. The information on each operation time may be used as data to determine the capacity of various appliances such as pumps or motors besides recognizing the correctness of the operational order.

In order to inform the users of the time required for rotating the rotary switch to activate the spin-dry, the starting and ending time of the rotating operation may be printed and outputted.

Thus, the function-operation correspondence table can be prepared when each function provided to the appliance has been operated, without forming or referring to the operational specification such as operation manuals.

If the function-operation correspondence table is applied to the protocols of the newly developed appliance, it can be utilized to check the presence of all the necessary functions and operational parts, and to form evaluation documents for better operations and functions.

If the function-operation correspondence table is formed based on old-fashioned type appliances, it may be reference data to form the function-operation correspondence table for a newly-developed appliance or to improve its operability.

The use of a micro computer allows the automatic formation of the function-operation correspondence table by using the operation contents recognition number storage unit 11 and the output unit 12, and further allows the automatic measurement and calculation performed in the first through sixth embodiments.

<EMBODIMENT 8>

The present embodiment is related to an apparatus for improving the operability of appliances.

The mechanical operational parts such as push buttons and rotary switches have problems in endurance and operability.

In addition, the contents of operations to be inputted to the appliance are mostly simple, so that a lot of operational parts are necessary to meet the variety of functions provided to the appliances. However, it is difficult in terms of cost and arrangement.

Therefore in the present embodiment, a transparent tablet is fixed on the liquid crystal display to recognize the contents of an operation indicated by a touching operation of the user, and to input the contents to the appliance. To be more specific, areas each corresponding to a button are displayed on the liquid crystal display, and a touch by the users is regarded as the input of an operation, accompanied by the output of a direction signal to the appliance.

Figure 22:
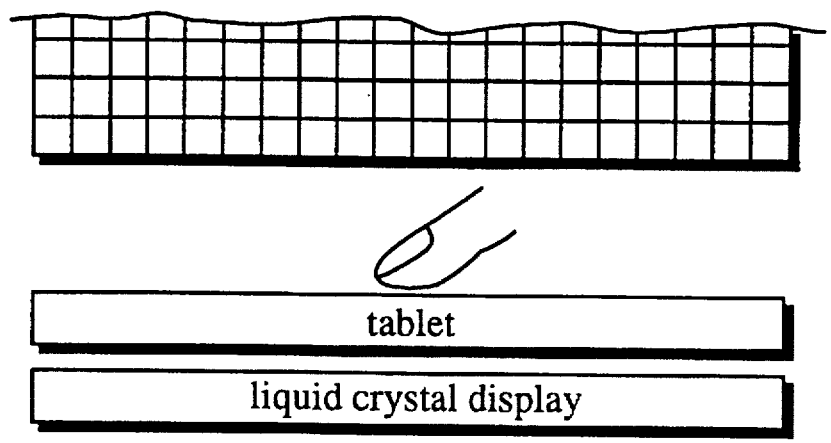
FIG. 22 is an example of operational part of a TV set which including a liquid crystal and a tablet.

As shown in FIG. 22, the input unit of the tablet is divided in accordance with the areas on of the liquid crystal display. FIG. 22 shows the display of the liquid crystal display, which is a guide to operate a TV set, the divided table provided thereon, and the combination of the liquid crystal display and the tablet.

Figure 23:
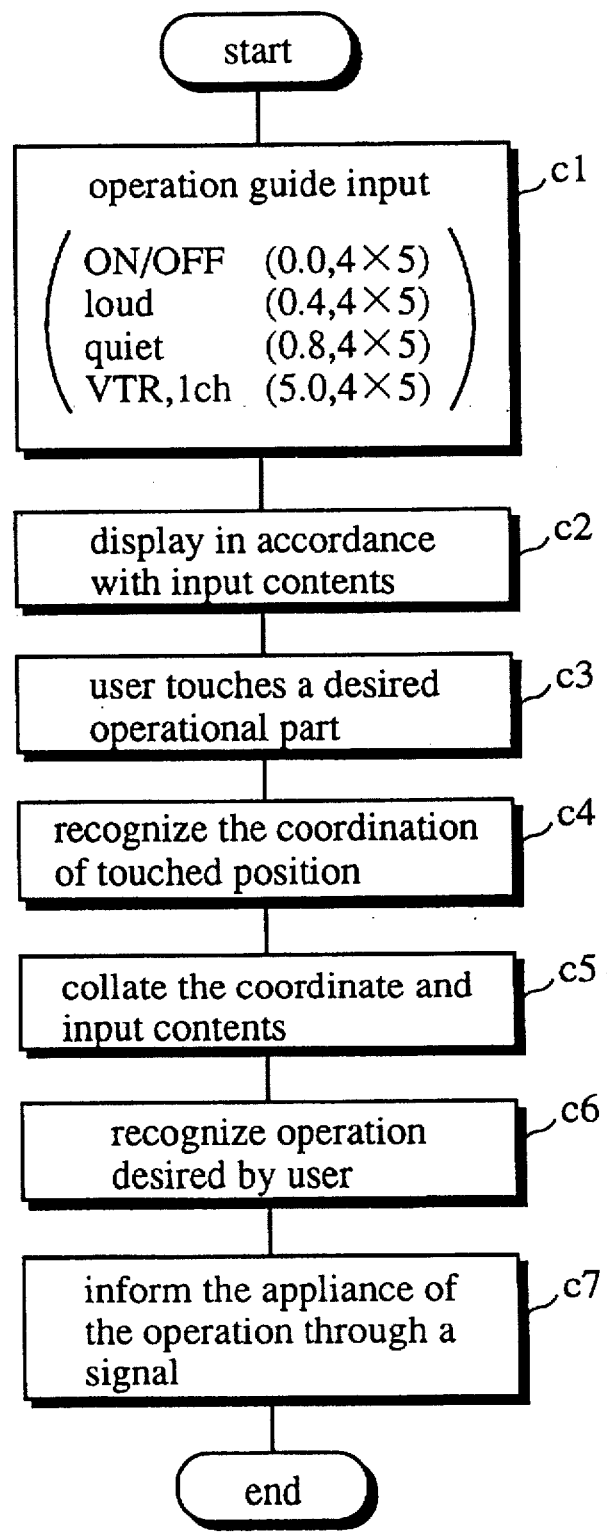
FIG. 23 is flowchart depicting the procedures to operate the operational part of the FIG. 22.

FIG. 23 is flowchart depicting the procedures of the apparatus of the present embodiment.

(c1) The contents to be displayed in the liquid crystal display as a guide to operate an appliance are inputted by the appliance designer.

(c2) The inputted contents are displayed. In the case of a TV set, for example, operational parts required for minimum operations are displayed. FIG. 22 shows the case of a TV set located in Osaka City in Japan. The VHS system TV broadcasting in Osaka City includes channels 2, 4, 6, 8, 10, and 12, and channel 1 is used for VTR. In order to select a minor program such as teletext, users touch the area of "other display" on the liquid crystal display, and as a result, more operational parts to be selected are displayed. The contents of display and the lining on the tablet can be converted to large extent by a program to be provided when the apparatus is assembled. The boarder lines between adjacent operational parts correspond to the division of the tablet.

(c3) The users refer to the operation guide on the liquid crystal display and touches a desired operational part displayed.

(c4) The operation unit of the CPU in the appliance detects the coordination which corresponds to a touched position on the tablet.

(c5) The detected coordination and the contents displayed are collated with each other.

(c6) The apparatus recognizes the operation intended by the operator.

(c7) The apparatus sends a direction corresponding to the intended operation to the appliance.

FIG. 24 shows the transition of the contents being displayed in FIG. 18. When the area "other display" is selected, the upper display of FIG. 24 appears. When the area "teletext" is selected, the lower display of FIG. 24 appears. In this case, the contents of the operations displayed and the division of the tablet can be done freely in software. In addition, several types of display contents may be stored to allow users to select a desired one in accordance with their ages and physical features.

For example, the area including ON/OFF shown in FIG. 22 is designed for right-handed people whose dominant eye is left, but this may be disposed in the opposite side for left-handed people to touch easily, and the character may be printed in a larger size for people with impaired vision.

Figure 25:
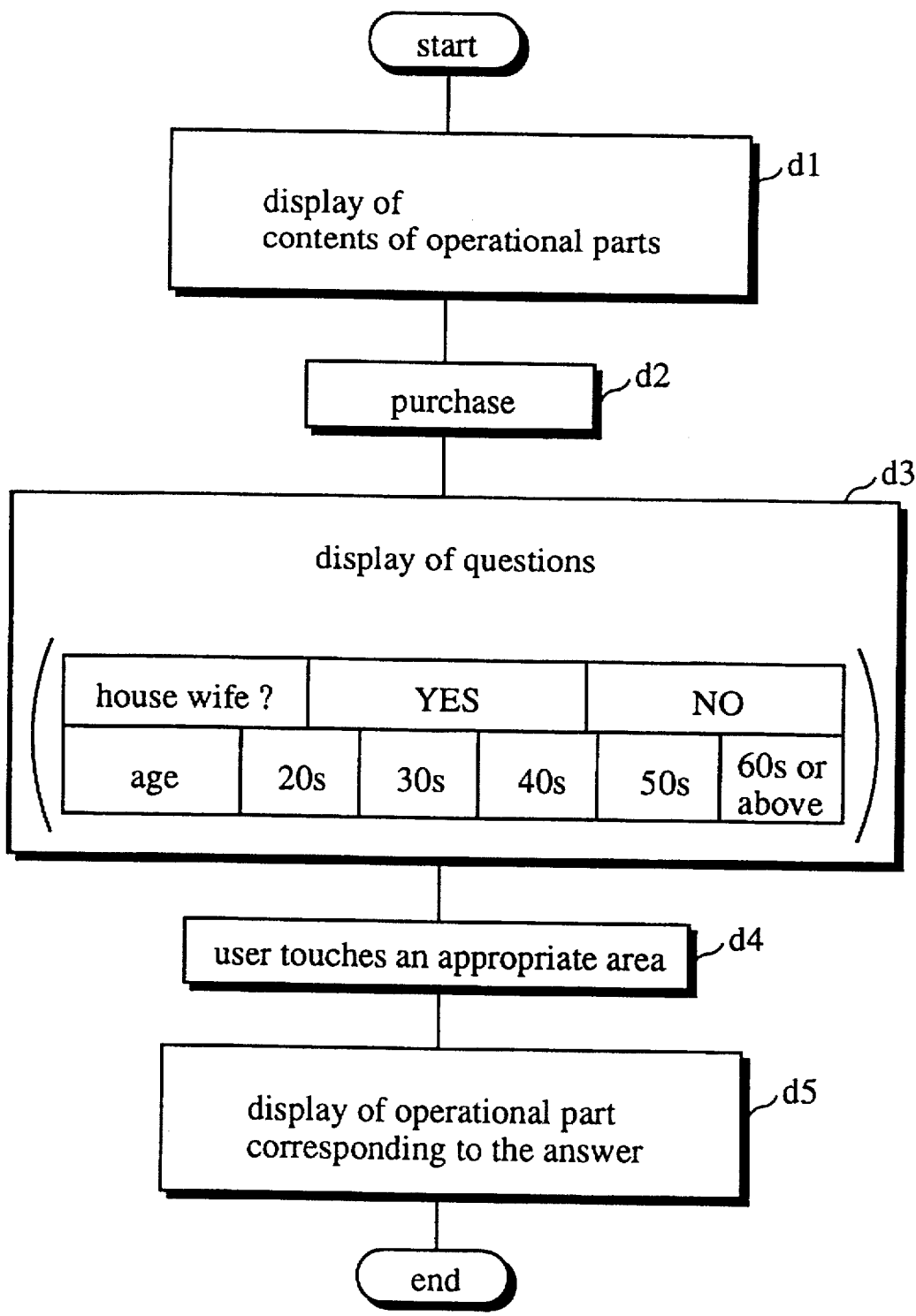
FIG. 25 is a flowchart depicting the procedures to form the operation apparatus for a TV set of the eighth embodiment.

Since TV sets are mass produced, it is easy to accommodate programs of the operation apparatus to the users' features. FIG. 25 shows a flowchart depicting the procedures as follows.

(d1) Several types of display contents of operational parts are prepared to meet the expected types of users in the case of washing machines and air conditioners as well as TV sets.

(d2) These appliances are sold.

(d3) The operation apparatus displays questions to ask users when the appliance is purchased, the questions including whether they are housewives or not and their age.

(d4) The users inputs appropriate answer by touching.

(d5) The operational part corresponding to the answer is displayed.

As shown in FIG. 25, the display unit of the operation apparatus first displays questions to users. The users answer the questions by touching appropriate answers, and as a result, users' conditions are inputted. The program of the appliance displays the most appropriate display about the operational part by repeating the questioning and answering operations.

In FIG. 26, the upper display is intended for the aged, people with impaired vision, and the disabled. Therefore, signs of "automatic mode", "amount increase", "spin-dry", "for heavy laundry", and "start" are exclusively displayed in large size. This is because these groups of users are poor in complicated button pressing operation and often use heavy clothes. In a case where other functions are necessary, the users can touch the area "other display" to select operational parts with complicated functions.

The lower display shows an example of the display while the automatic mode is in process. The "second rinse" of the current stage of a wash and "stop" switch are exclusively displayed in a large size.

In a case of cooking appliances such as micro wave ovens, operation guides and operational parts for pock or beef dishes may be designed not to be displayed in a case where an inputted user is a Moslem or a Hindu. Consequently, the operability of the appliance is greatly improved.

Air conditioners are required to perform different functions between the summer and the winter. The lights in show windows of stores are required to have different intensity and colors between day and night. Therefore, the operation apparatus to be used for such appliances may be designed to change the display contents of its operational parts depending on date and time. In this case, display contents in accordance with data and time are previously inputted and a clock with a calendar is also provided.

The operation apparatus may be integrated into the main body of the appliance or may be separate.

Software is more flexible, less expensive, and lighter in weight than the hardware such as push buttons and rotary switches. In addition, the operation panel, which demands only small space can also make the appliance smaller and lighter-in weight. Furthermore, the operation panel can be used as a common hardware, regardless of the types of the appliances. As a result, besides the operability, the appliance becomes less expensive and easier to be carried.

Furthermore, a learning skill may be added to provide better display depending on the actual using conditions. To be more specific, less frequently used operational parts may not be displayed or displayed in small size.

The contents of users' operations may be recognized automatically, stored in a memory, and collected by the manufacture of the appliance after a certain period for future use. Unlike the sixth and seventh embodiments, the operation parts themselves are formed like programs, so that they can be easily stored as programs. Consequently, it becomes unnecessary to complicated connecting operations or a large scale questionnaire.

An LED may be used instead of the liquid crystal display which is used in the present embodiment to display the operational parts.

Users may answer the questions by referring to a guidance printed separately.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

finding a total number of times each of the operational parts is actuated to exert all the functions in a case where all the functions are selected one time each, by using the function-operation correspondence table;

adding up all the total numbers of times;

calculating a ratio of the number of times each of the operational parts is actuated to the total numbers of times all the operational parts are actuated to exert all the functions;

finding unbalance of using frequencies among the operational parts, from the calculated ratio and the number of the operational parts; and evaluating the operability of the appliance, based on the unbalance found.

2. The method of claim 1 further comprising the steps of:

forming a data base from results of questionnaire and/or protocol analyses, the data base including countermeasures against a high-use operational part, the countermeasures being based on a type, size, position, durability, material, and model of the high-use operational part; and exercising the countermeasures in a case where the unbalance is judged to be non-preferable.

3. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

forming a data base from surveyed data, the data base including a frequency at which each of the functions is selected;

calculating a ratio of the number of times each of the operational parts is actuated to the total numbers of times all the operational parts are actuated to exert all the functions in a case where each of the functions is selected at the frequency included in the data base, by using the function-operation correspondence table and the data base;

finding unbalance of using frequencies among the operational parts, from the calculated ratio and the number of the operational parts; and evaluating the operability of the appliance, based on the unbalance found.

4. The method of claim 3 further comprising the steps of:

forming a data base from results of questionnaire and/or protocol analyses, the data base including countermeasures against a high-use operational part, the countermeasures being based on a type, size, position, durability, material, and model of the high-use operational part; and exercising the countermeasures in a case where the unbalance is judged to be non-preferable.

5. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

finding a total number of times each of the operational parts is actuated to exert all the functions in a case where all the functions are selected one time each, by using the function-operation correspondence table;

adding up all the total numbers of times;

forming a data base from protocol analyses and/or questionnaire, the data base including an average operation time required to actuate each of the operational parts;

finding an average operation time required to actuate each of the operational parts in a case where all the functions are selected one time each, by multiplying the number of times each of the operational parts is actuated by the average operation time of each of the operational parts;

adding up the total average operation times of all the operational parts;

calculating a ratio of the average operation time of each of the operational parts to the total operation times of all the operational parts;

finding unbalance of using frequencies among the operational parts, from the calculated ratio and the number of the operational parts; and evaluating the operability of the appliance, based on the unbalance found.

6. The method of claim 5 further comprising the steps of:

forming a data base from results of questionnaire and/or protocol analyses, the data base including countermeasures against an operational part having a high operation time ratio, the countermeasures being based on a type, size, position, durability, material, and model of the operational part having the high operation time ratio; and exercising the countermeasures in a case where the unbalance is judged to be non-preferable.

7. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

forming a data base from surveyed data, the data base including a frequency at which each of the functions are selected in accordance with an operator's age, sex, physical features, address, and the like;

selecting a type of the operator from the data base;

calculating a ratio of a number of times to actuate each of the operational parts to a total number of times to actuate all of the operational parts in a case where the functions are selected at the frequency corresponding to the selected type of the operator, by using the function-operation correspondence table and the data base;

finding unbalance of using frequencies among the operational parts by the selected type of the operator, from the calculated ratio and the number of the operational parts; and evaluating the operability of the appliance, based on the unbalance found.

8. The method of claim 7 further comprising the steps of:

forming a data base from results of questionnaire and/or protocol analyses, the data base including countermeasures against a high-use operational part, the countermeasures being based on a type, size, position, durability, material, and model of the high-use operational part; and exercising the countermeasures in a case where the unbalance is judged to be non-preferable.

9. The method of claim 7 further comprising the steps of:

forming a data base, in accordance with the type of the operator, from questionnaire and/or protocol analyses, the data base including countermeasures against a high-use operational part, the countermeasures being based on a type, size, position, durability, material, and model of the high-use operational part; and exercising the countermeasures by utilizing the data base in a case where the using frequency is judged to be non-preferable.

10. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

forming a data base from surveyed data, the data base including an average operation time of each of the operational parts in accordance with the type of the operator;

selecting a type of the operator from the data base;

calculating a ratio of a number of times to actuate each of the operational parts to a total number of times to actuate all of the operational parts in a case where all the functions are selected evenly in the average operation time in accordance with the selected type of the operator, by using the function-operation correspondence table and the average operation time of each of the operational parts;

finding unbalance of operation times among the operational parts, from the calculated ratio and the number of the operational parts; and evaluating the operability of the appliance, based on the unbalance found.

11. The claim 10 further comprising the steps of:

forming a data base from results of questionnaire and/or protocol analyses, the data base including countermeasures against an operational part having a high operation time ratio, the countermeasures being based on a type, size, position, durability, material, and model of the operational part having the high operation time ratio; and exercising the countermeasures in a case where the unbalance is judged to be non-preferable.

12. The claim 10 further comprising the steps of:

forming a data base corresponding to each type of operators from questionnaire and/or protocol analyses, the data base including countermeasures against a high-use operational part, the countermeasures being based on a type, size, position, durability, material, and model of the high-use operational part; and exercising the countermeasures by utilizing the data base in a case where the unbalance is judged to be non-preferable.

13. A method for evaluating operability of a completed appliance at a designing stage, comprising the steps of:

forming a function-operation correspondence table which includes functions that the completed appliance is supposed to have, operational parts to exert each of the functions, and a number of times each of the operational parts is actuated to exert each of the functions;

forming a first data base from surveyed data, the first data base including a frequency at which each of the functions is selected in accordance with an operator's age, sex, physical features, address, and the like;

forming a second data base from surveyed data, the second data base including an average operation time of each of the operational parts in accordance with the type of the operator;

selecting a type of the operator;

calculating at least one of a ratio of the number of times to actuate each of the operational parts to the total number of times to actuate all the operational parts and a ratio of an operation time required to actuate each of the operational parts to a total operation time required to actuate all of the operational parts in a case where the functions are selected at the frequency in accordance with the selected operator's type, by using the function-operation correspondence table and at least one of the data on the function using frequency and the data on the average operation time;

finding unbalance of operation times among the operational parts, from the calculated ratio; and evaluating the operability of the appliance, based on the unbalance found.

14. The method of claim 13 further comprising the steps of:

forming a third data base from questionnaire and/or protocol analyses, the third data base including countermeasures against an operational part having a high frequency of use and high operation time ratio, the countermeasures being based on a type, size, position, durability, material, and model of the operational part; and exercising the countermeasures by utilizing the third data base in a case where the unbalance is judged to be non-preferable.

15. The method of claim 14 further comprising the steps of:

forming a fourth data base, in accordance with a type of the operator, from questionnaire and/or protocol analyses, the fourth data base including countermeasures against an operational part with a high frequency of use and high operation time ratio, the countermeasures being based on a type, size, position, durability, material, and model of the operational part; and exercising the countermeasures by utilizing the fourth data base in a case where the unbalance is judged to be non-preferable.

16. A method for evaluating operability of a completed appliance at a designing stage, comprising the steps of:

providing each operational part of the appliance with a terminal which outputs an identification signal for identifying the operational part when an operator actuates the operational part;

connecting the terminal to an output means and CPU, and informing the CPU of operational parts actuated by the operator;

actuating each of the operational parts by the operator to sequentially exert functions to be provided to the completed appliance;

forming a function-operation correspondence table on which each of the functions is associated with operational parts required to exert the function and a number of operations to actuate each of the operational parts; and evaluating the operability of the appliance in terms of the number of operations to actuate each of the operational parts, based on the function-operation correspondence table formed.

17. A method for evaluating operability of a completed appliance at a designing stage, comprising the steps of:

providing each operational part of the appliance with a terminal which outputs an identification signal for identifying the operational part and an operation time of the operational part when an operator actuates the operational part;

connecting the terminal to an output means and CPU, and informing the CPU of each operational part actuated by the operator and an operational time of the operational part as a pair;

actuating each of the operational parts by the operator to sequentially exert functions to be provided to the completed appliance;

forming a function-operation correspondence table on which each of the functions is associated with operational parts required to exert the function and a number of operations to actuate each of the operational parts; and adding one of a total operation time required for exerting all the functions and a total operation time required for actuating all the operational parts to the function-operation correspondence table formed; and evaluating the operability of the appliance in terms of at least one of the operation times of the functions required to exert the functions and the operation times required to actuate the operational parts, based on the function-operation correspondence table formed.

18. A method for evaluating operability of a completed appliance intended for a specific type of operators, at a designing stage, comprising the steps of:

providing each operational part of the appliance with a terminal which outputs an identification signal for identifying the operational part and an operation time of the operational part when an operator actuates the operational part;

connecting the terminal to an output means and CPU, and informing the CPU of each operational part actuated by the operator and an operational time of the operational part as a pair;

actuating each of the operational parts by the specific type of operators to sequentially exert functions to be provided to the completed appliance;

forming a function-operation correspondence table on which each of the functions is associated with operational parts required to exert the function and a number of operations to actuate each of the operational parts; and adding at least one of a total operation time required for the specific type of operators to exert all the functions and a total operation time required for the specific type of operators to actuate all the operational parts to the function-operation correspondence table formed; and evaluating the operability of the appliance for the specific type of operators in terms of at least one of the operation times of the functions required to exert the functions and the operation times required to actuate the operational parts, based on the function-operation correspondence table formed.

19. The method of claim 18 further comprising the steps of:

calculating an average operation time required for a specific type of operators to actuate each of the operational parts, as a result of the connecting step and the actuating step; and forming a data base including the average operation time calculated, the data base is used to design an appliance intended for a specific type of operators.

20. An apparatus for evaluating operability of a completed appliance at a designing stage, comprising:

a table storing means for storing a function-operation correspondence table which indicates functions that the completed appliance is supposed to have, operational parts with which an operator selects each of the functions, and a number of times the operator actuates each of the operational parts to select the functions;

an actuation number finding means for finding a total number of times the operator actuates each of the operational parts in a case where all the functions are selected one time each, by using the function-operation correspondence table;

an adding means for adding up the total number of times the operator actuates all of the operational parts;

a calculating means for calculating a ratio of the number of times the operator actuates each of the operational parts to a total number of times the operator actuates all of the operational parts;

a frequency finding means for finding unbalance of using frequencies among the operational parts, from the calculated ratio and the number of the operational parts; and an outputting means for evaluating the operability of the appliance, based on the unbalance found, and outputting evaluation results in a predetermined manner.

21. The apparatus of claim 20 further comprising:

a data base storing means for storing a data base formed from questionnaire and/or protocol analyses, the data base including countermeasures against a high-use operational part, the countermeasures being based on a type, size, position, durability, material, and model of the high-use operational part; and a displaying means for displaying the countermeasures by utilizing the data base in a case where the unbalance found is judged to be non-preferable.

22. An apparatus for evaluating operability of a completed appliance at a designing stage, comprising:

a table storing means for storing a function-operation correspondence table which indicates functions that the completed appliance is supposed to have, operational parts with which an operator selects each of the functions, and a number of times the operator actuates each of the operational parts to select the functions;

a function frequency data storing means for storing surveyed data including a frequency at which the operator selects each of the functions;

a calculating means for calculating a ratio of the number of times the operator actuates each of the operational parts to a total number of times the operator actuates all of the operational parts in a case where the operator selects each of the functions at the frequency indicated in the data base, by using the function-operation correspondence table and the data base;

a frequency finding means for finding unbalance of using frequencies among the operational parts, from the calculated ratio and the number of the operational parts; and an outputting means for evaluating the operability of the appliance, based on the unbalance found, and outputting evaluation results in a predetermined manner.

23. The apparatus of claim 22 further comprising:

a data base storing means for storing a data base formed from questionnaire and/or protocol analyses, the data base including countermeasures against a high-use operational part, the countermeasures being based on a type, size, position, durability, material, and model of the high-use operational part; and a displaying means for displaying the countermeasures by utilizing the data base in a case where the unbalance found is judged to be non-preferable.

24. An apparatus for evaluating operability of a completed appliance at a designing stage, comprising:

a table storing means for storing a function-operation correspondence table which indicates functions that the completed appliance is supposed to have, operational parts with which an operator selects each of the functions, and a number of times the operator actuates each of the operational parts to select the functions;

an actuation number finding means for finding a total number of times the operator actuates each of the operational parts in a case where all the functions are selected one time each, by using the function-operation correspondence table;

an adding means for adding up the total number of times the operator actuates all of the operational parts;

an operation time storing means for storing an average operation time required for the operator to actuate each of the operational parts, from protocol analyses and/or questionnaire;

an operation time finding means for finding an average operation time of each of the operational parts in a case where all the functions are selected one time each by multiplying the number of times each of the operational parts is actuated by the average operation time of each of the operational parts;

a totalling means for totalling the average operation time of each of the operational parts;

a calculating means for calculating a ratio of the average operation time of each of the operational part to a total operation time required for actuating all the operational parts;

an unbalanced using frequency finding means for finding unbalance of using frequencies among the operational parts, from the calculated ratio and the number of the operational parts; and an outputting means for evaluating the operability of the appliance in a predetermined manner, based on the unbalance found, and outputting evaluated results.

25. The apparatus of claim 24 further comprising:

a data storing means for storing a data base formed from questionnaire and/or protocol analyses, the data base including countermeasures against an operational part with a high operation time ratio, the countermeasures being based on a type, size, position, durability, material, and model of the operational part with operation time ratio; and an displaying means for displaying the countermeasures by utilizing the data base in a case where the unbalance is judged to be non-preferable.

26. An apparatus for evaluating operability of a completed appliance at a designing stage, comprising:

a table storing means for storing a function-operation correspondence table which indicates functions that the completed appliance is supposed to have, operational parts with which an operator selects each of the functions, and a number of times the operator actuates each of the operational parts to select the functions;

a data storing means for storing a data base formed from surveyed data, the data base including a frequency at which the operator selects each of the functions in accordance with the operator's age, sex, physical features, address, and the like;

a selecting means for selecting a type of the operator from the data base;

a calculating means for calculating a ratio of the number of times the operator actuates each of the operational parts to a total number of times the operator actuates all of the operational parts in a case where the functions are selected at the frequency in accordance with the selected type of the operator;

a frequency finding means for finding unbalance of using frequencies among the operational parts, from the calculated ratio and the number of the operational parts; and an output means for evaluating the operability of the appliance, based on the unbalance found, and outputting evaluated results.

27. The apparatus of claim 26 further comprising:

a data base storing means for storing a data base formed from questionnaire and/or protocol analyses, the data base including countermeasures against a high-use operational part, the countermeasures being based on a type, size, position, durability, material, and model of the high-use operational part; and an displaying means for displaying the countermeasures by utilizing the data base in a case where the unbalance found is judged to be non-preferable.

28. The apparatus of claim 26 further comprising:

a table storing means for storing a data base formed from questionnaire and/or protocol analyses, the data base including countermeasures against a high-use operational part, the countermeasures being based on a type, size, position, durability, material, and model of the high-use operational part depending on a specific type of operators; and an displaying means for displaying the countermeasures by utilizing the data base in a case where the unbalance found is judged to be non-preferable.

29. An apparatus for evaluating operability of a completed appliance at a designing stage, comprising:

a table storing means for storing a function-operation correspondence table which includes functions that the completed appliance is supposed to have, operational parts to exert each of the functions, and a number of times each of the operational parts is actuated to exert each of the functions;

a data base storing means for storing a data base formed from surveyed data, the data base including an average operation time of each of the operational parts in accordance with the type of the operator;

a selecting means for selecting a type of the operator from the data base;

a calculating means for calculating a ratio of a number of times to actuate each of the operational parts to a total number of times to actuate all of the operational parts in a case where all the functions are selected evenly in the average operation time in accordance with the selected type of the operator, by using the function-operation correspondence table and the average operation time of each of the operational parts;

a unbalance finding means for finding unbalance of operation times among the operational parts, from the calculated ratio and the number of the operational parts; and an evaluating means for evaluating the operability of the appliance, based on the unbalance found.

30. The apparatus of claim 29 further comprising:

a data storing means for storing a data base formed from questionnaire and/or protocol analyses, the data base including countermeasures against an operational part with a high operation time ratio, the countermeasures being based on a type, size, position, durability, material, and model of the operational part with operation time ratio; and a displaying means for displaying the countermeasures by utilizing the data base in a case where the unbalance is judged to be non-preferable.

31. The apparatus of claim 29 further comprising:

a data base storing means for storing a data base corresponding to each type of operators formed from questionnaire and/or protocol analyses, the data base including countermeasures against a high-use operational part, the countermeasures being based on a type, size, position, durability, material, and model of the high-use operational part; and a displaying means for displaying the countermeasures by utilizing the data base in a case where the unbalance is judged to be non-preferable.

32. An apparatus for evaluating operability of a completed appliance at a designing stage, comprising:

a table storing means for storing a function-operation correspondence table which includes functions that the completed appliance is supposed to have, operational parts to exert each of the functions, and a number of times each of the operational parts is actuated to exert each of the functions;

a data base storing means for storing a data base formed from surveyed data, the data base including a frequency at which each of the functions are selected in accordance with an operator's age, sex, physical features, address, and the like;

an average operation time storing means for storing a data base formed from surveyed data, the data base including an average operation time of each of the operational parts in accordance with the type of the operator;

a selecting means for selecting a type of the operator;

a calculating means for calculating at least one of a ratio of the number of times to actuate each of the operational parts to the total number of times to actuate all the operational parts and a ratio of an operation time required to actuate each of the operational parts to a total operation time required to actuate all of the operational parts in a case where the functions are selected at the frequency in accordance with the selected operator's type, by using the function-operation correspondence table and at least one of the data on the function using frequency and the data on the average operation time;

an unbalance finding means for finding unbalance of operation times among the operational parts, from the calculated ratio; and an evaluating means for evaluating the operability of the appliance, based on the unbalance found.

33. The apparatus of claim 32 further comprising:

a data base storing means for storing a data base formed from questionnaire and/or protocol analyses, the data base including countermeasures against an operational part having a high frequency of use and high operation time ratio, the countermeasures being based on a type, size, position, durability, material, and model of the operational part; and a display means for displaying the countermeasures by utilizing the data base in a case where the unbalance is judged to be non-preferable.

34. The apparatus of claim 32 further comprising:

a data base storing means for storing a data base formed from questionnaire and/or protocol analyses, the data base including countermeasures against an operational part having a high frequency of use and high operation time ratio, the countermeasures being based on a type, size, position, durability, material, and model of the operational part; and a display means for displaying the countermeasures by utilizing the data base in a case where the unbalance is judged to be non-preferable.

* * * * *